(12) United States Patent
Takahashi et al.

(10) Patent No.: US 11,996,754 B2
(45) Date of Patent: May 28, 2024

(54) MOTOR, FAN, AIR CONDITIONER, AND MANUFACTURING METHOD OF MOTOR

(71) Applicant: Mitsubishi Electric Corporation, Tokyo (JP)

(72) Inventors: Ryogo Takahashi, Tokyo (JP); Hiroki Aso, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 372 days.

(21) Appl. No.: 17/621,753

(22) PCT Filed: Jul. 20, 2020

(86) PCT No.: PCT/JP2020/028043
§ 371 (c)(1),
(2) Date: Dec. 22, 2021

(87) PCT Pub. No.: WO2021/020195
PCT Pub. Date: Feb. 4, 2021

(65) Prior Publication Data
US 2022/0352780 A1 Nov. 3, 2022

(30) Foreign Application Priority Data
Jul. 26, 2019 (WO) .................. PCT/JP2019/029329

(51) Int. Cl.
*H02K 5/173* (2006.01)
*F24F 11/72* (2018.01)
(Continued)

(52) U.S. Cl.
CPC ............ *H02K 5/1732* (2013.01); *F24F 11/72* (2018.01); *H02K 1/276* (2013.01); *H02K 7/083* (2013.01);
(Continued)

(58) Field of Classification Search
CPC ........ H02K 21/16; H02K 11/33; H02K 1/276; H02K 9/227; H02K 5/1732; H02K 7/083;
(Continued)

(56) References Cited

U.S. PATENT DOCUMENTS 8,803,374 B2 * 8/2014 Yoshida ............... H02K 5/1672
310/90
9,455,600 B2 * 9/2016 Yamamoto ........... H02K 11/215
(Continued)

FOREIGN PATENT DOCUMENTS

JP S53-121108 A 10/1978
JP S55-056462 U 4/1980
(Continued)

OTHER PUBLICATIONS

Decision of Refusal dated Aug. 30, 2022 in connection with counterpart Japanese Patent Application No. 2021-536956 (and English Machine Translation).
(Continued)

*Primary Examiner* — Alex W Mok
(74) *Attorney, Agent, or Firm* — POSZ LAW GROUP, PLC

(57) ABSTRACT

A motor includes a rotor having a rotation shaft and a bearing mounted to the rotation shaft, a stator surrounding the rotor, a heat dissipation member provided on one side of the rotor in an axial direction of the rotation shaft, and a resin portion covering the stator and at least a part of the heat dissipation member. The heat dissipation member has a first concave portion surrounding the bearing from an outer side in a radial direction about the rotation shaft, and a second concave portion famed on an inner side of the first concave portion in the radial direction.

20 Claims, 23 Drawing Sheets

(51) Int. Cl.
*H02K 1/276* (2022.01)
*H02K 7/08* (2006.01)
*H02K 9/22* (2006.01)
*H02K 11/33* (2016.01)
*H02K 15/12* (2006.01)
*H02K 21/16* (2006.01)

(52) U.S. Cl.
CPC .............. *H02K 9/227* (2021.01); *H02K 11/33* (2016.01); *H02K 15/12* (2013.01); *H02K 21/16* (2013.01); *H02K 2211/03* (2013.01)

(58) Field of Classification Search
CPC .... H02K 15/12; H02K 5/225; H02K 2203/09; H02K 3/522; H02K 2211/03; F24F 11/72
USPC .......................................................... 310/64
See application file for complete search history.

(56) References Cited

U.S. PATENT DOCUMENTS

| | | | |
|---|---|---|---|
| 9,515,532 B2* | 12/2016 | Yamamoto | H02K 5/02 |
| 9,673,678 B2* | 6/2017 | Okada | H02K 5/08 |
| 2007/0103101 A1 | 5/2007 | Kikuchi et al. | |
| 2013/0127303 A1 | 5/2013 | Matsumoto | |
| 2015/0188383 A1* | 7/2015 | Okada | H02K 5/24 |
| | | | 310/43 |
| 2016/0013699 A1* | 1/2016 | Yabe | H02K 5/15 |
| | | | 310/43 |
| 2016/0099623 A1 | 4/2016 | Bohm et al. | |
| 2016/0365779 A1* | 12/2016 | Watanabe | H02K 15/12 |
| 2017/0201153 A1* | 7/2017 | Yamanaka | H02K 1/30 |
| 2018/0212483 A1* | 7/2018 | Baba | H02K 1/276 |
| 2019/0386530 A1 | 12/2019 | Takahashi et al. | |
| 2020/0021168 A1 | 1/2020 | Aso et al. | |
| 2020/0067358 A1 | 2/2020 | Takahashi et al. | |

FOREIGN PATENT DOCUMENTS

| | | |
|---|---|---|
| JP | S57-036770 U | 2/1982 |
| JP | S59-106853 A | 6/1984 |
| JP | H08-140311 A | 5/1996 |
| JP | 2006-033986 A | 2/2006 |
| JP | 2007-216612 A | 8/2007 |
| JP | 2012-200055 A | 10/2012 |
| JP | 2013-110841 A | 6/2013 |
| JP | 2016-077141 A | 5/2016 |
| WO | 2017/168728 A1 | 10/2017 |
| WO | 2018/037449 A1 | 3/2018 |
| WO | 2018/061111 A1 | 4/2018 |
| WO | 2018/134988 A1 | 7/2018 |

OTHER PUBLICATIONS

Office Action dated Jun. 14, 2022 in connection with counterpart Japanese Patent Application No. 2021-536956 (and English machine translation).

International Search Report dated Oct. 6, 2020, issued in corresponding International Patent Application No. PCT/JP2020/028043.

* cited by examiner

MOTOR, FAN, AIR CONDITIONER, AND MANUFACTURING METHOD OF MOTOR

CROSS REFERENCE TO RELATED APPLICATIONS

This application is a U.S. National Stage Application of International Patent Application No. PCT/JP2020/028043 filed on Jul. 20, 2020, which designated the U.S. and claims the benefit of priority from PCT/JP2019/029329 filed on Jul. 26, 2019. The entire disclosures of all of the above applications are incorporated herein by reference.

TECHNICAL FIELD

The present invention relates to a motor, a fan, an air conditioner, and a manufacturing method of the motor.

BACKGROUND

A motor includes a heat dissipation member, such as a heatsink, for releasing heat to the outside. The heat dissipation member is fixed to a stator of the motor by press-fitting, screwing, or the like (see, for example, Patent Reference 1).

PATENT REFERENCE

Patent Reference 1

International Publication WO 2017/168728 (see FIG. 1)

However, in a conventional configuration, improvement in heat dissipation property is limited due to a contact thermal resistance between the motor and the heat dissipation member. In addition, if the heat dissipation member and the stator are integrally molded with a resin in order to reduce the contact thermal resistance, it is difficult to position the heat dissipation member in a mold. When a positional accuracy of the heat dissipation member in the mold is low, a positional accuracy of the heat dissipation member with respect to the stator decreases. The misalignment between the stator and the heat dissipation member causes vibration and noise in the motor.

SUMMARY

The present invention is intended to solve the above-described problem, and an object of the present invention is to improve the heat dissipation property of a motor and also to improve a positional accuracy of a heat dissipation member with respect to a stator.

A motor according to an aspect of the present invention includes a rotor having a rotation shaft and a bearing mounted to the rotation shaft, a stator surrounding the rotor, a heat dissipation member provided on one side of the rotor in an axial direction of the rotation shaft, and a resin portion having a bearing holding portion that holds the bearing and covering the stator and at least a part of the heat dissipation member. The heat dissipation member has a first concave portion surrounding the bearing holding portion from an outer side in a radial direction about the rotation shaft, and a second concave portion famed on an inner side of the first concave portion in the radial direction.

According to the present invention, heat generated in the stator can be dissipated via the resin portion and the heat dissipation member, and thus the heat dissipation property of the motor can be improved. Further, by bringing a positioning member of a mold into engagement with the second concave portion, the positional accuracy of the heat dissipation member in the mold can be improved. Thus, the positional accuracy of the heat dissipation member with respect to the stator can be improved, and thereby vibration and noise of the motor can be suppressed.

DETAILED DESCRIPTION

Embodiments of the present invention will be described in detail below with reference to the figures. The present invention is not limited to these embodiments.

First Embodiment (Configuration of Motor 1)

Figure 1:
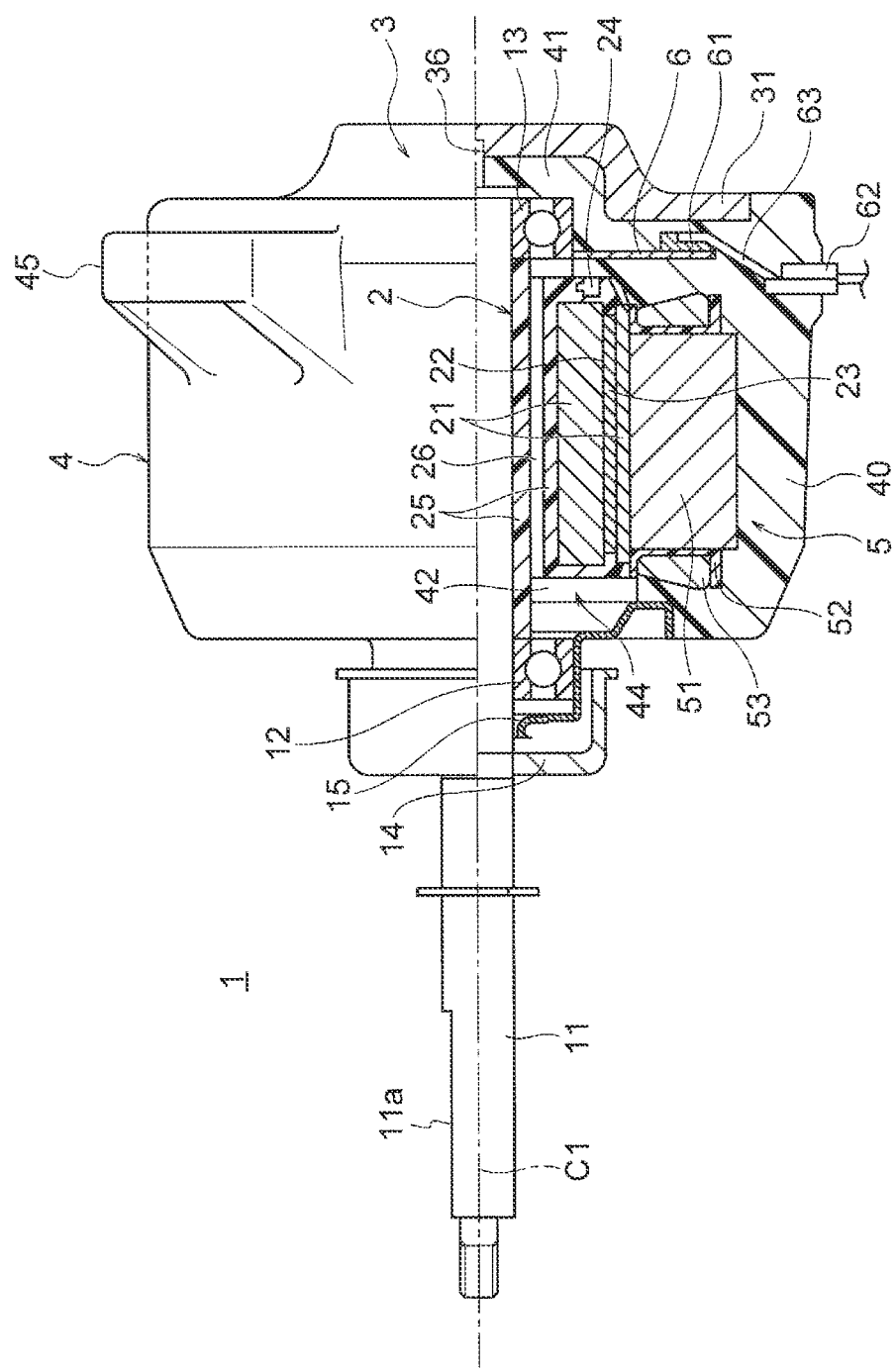
FIG. 1 is a partial sectional view illustrating a motor of a first embodiment.

FIG. 1 is a partial sectional view illustrating a motor 1 of a first embodiment. The motor 1 is, for example, a brushless DC motor that is used in a fan of an air conditioner.

The motor 1 includes a rotor 2 having a rotation shaft 11 and a mold stator 4. The mold stator 4 includes a stator 5 having an annular shape and surrounding the rotor 2, a circuit board 6, a heat dissipation member 3, and a mold resin portion 40 covering these components and serving as a resin portion. The rotation shaft 11 is a shaft for rotation of the rotor 2.

In the description below, a direction of an axis C1, which is a center axis of the rotation shaft 11, is referred to as an "axial direction". A circumferential direction (indicated by an arrow R1 in FIG. 2 and other figures) about the axis C1 of the rotation shaft 11 is referred to as a "circumferential direction". A radial direction about the axis C1 of the rotation shaft 11 is referred to as a "radial direction".

The rotation shaft 11 protrudes from the mold stator 4 to the left side in FIG. 1. An impeller 505 (FIG. 26(A)) of a fan, for example, is mounted to a mounting portion 11a formed at a protruding portion of the rotation shaft 11. Thus, the protruding side (the left side in FIG. 1) of the rotation shaft 11 is referred to as a "load side", while the opposite side (the right side in FIG. 1) of the rotation shaft 11 is referred to as a "counter-load side".

(Configuration of Rotor 2)

Figure 2:
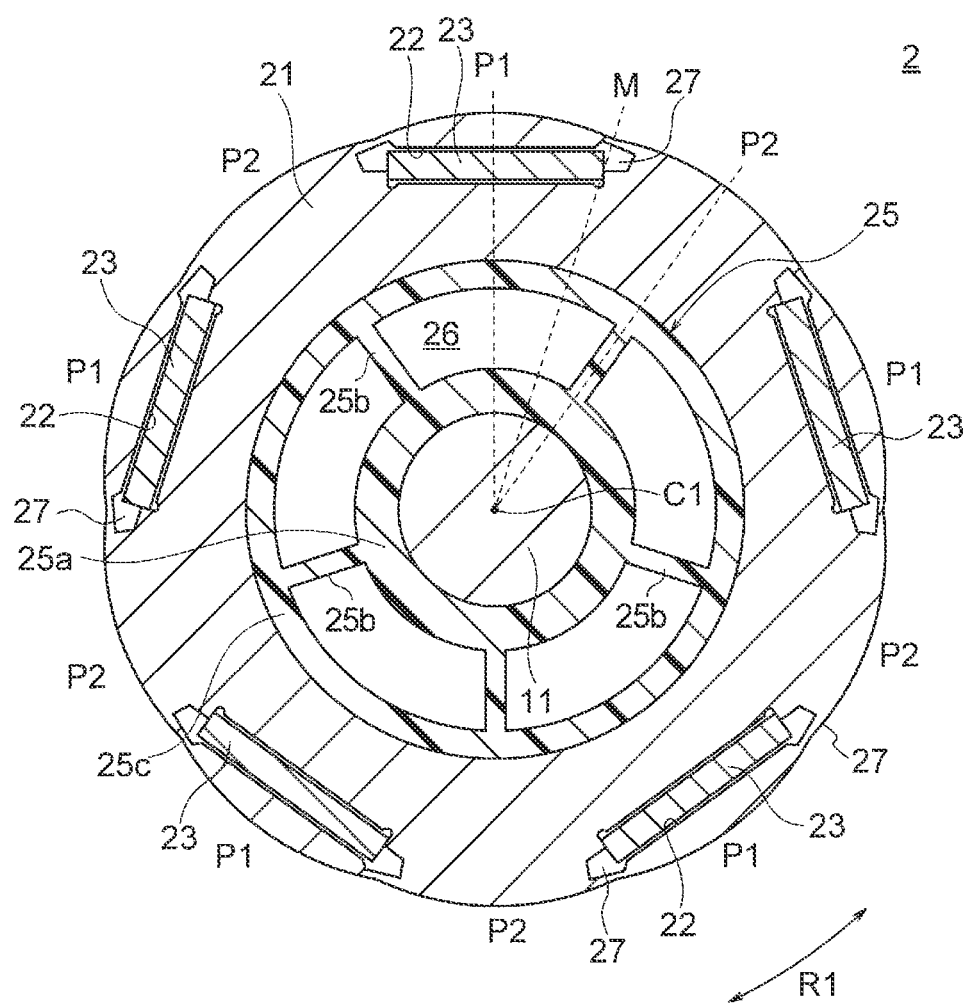
FIG. 2 is a sectional view illustrating a rotor of the motor of the first embodiment.

FIG. 2 is a sectional view illustrating the rotor 2. As illustrated in FIG. 2, the rotor 2 includes the rotation shaft 11 serving as a shaft for rotation, a rotor core 21 disposed on an outer side of the rotation shaft 11 in the radial direction, a plurality of magnets 23 embedded in the rotor core 21, and a resin portion 25 provided between the rotation shaft 11 and the rotor core 21.

The rotor core 21 is a member having an annular shape about the axis C1 and is provided on the outer side of the rotation shaft 11 in the radial direction. The rotor core 21 is famed of a plurality of stacking elements that are stacked in the axial direction and fixed integrally by crimping, welding, or bonding. The stacking elements are, for example, electromagnetic steel sheets. Each of the staking elements has a sheet thickness of 0.1 mm to 0.7 mm.

The rotor core 21 has a plurality of magnet insertion holes 22. The magnet insertion holes 22 are arranged at equal intervals in the circumferential direction and at equal distances from the axis C1. The number of magnet insertion holes 22 is five in this example. Each magnet insertion hole 22 extends linearly in a direction perpendicular to a straight line extending in the radial direction and passing through a center of the magnet insertion hole 22 in the circumferential direction. The magnet insertion hole 22 may be formed in a V shape.

A flux barrier 27, which is an aperture, is formed on each of both sides of the magnet insertion hole 22 in the circumferential direction. A thin-walled portion is famed between the flux barrier 27 and an outer circumference of the rotor core 21. In order to suppress leakage magnetic flux between adjacent magnetic poles, a thickness of the thin-walled portion is set, for example, equal to the sheet thickness of the stacking element.

The magnet 23, which is a permanent magnet, is inserted in each magnet insertion hole 22. The magnet 23 is composed of a rare earth magnet that contains, for example, neodymium (Nd), iron (Fe) and boron (B). The magnet 23 is also referred to as a main magnet.

Five magnets 23 have the same magnetic poles on the outer side in the radial direction. In a region of the rotor core 21 between the magnets 23 adjacent in the circumferential direction, a magnetic pole opposite to those of the magnets 23 is famed.

Therefore, five magnet magnetic poles P1 famed by the magnets 23 and five virtual magnetic poles P2 famed by portions of the rotor core 21 are arranged alternately in the circumferential direction in the rotor 2. Such a rotor 2 is referred to as a consequent-pole rotor.

Hereinafter, the team "magnetic poles" denotes both the magnet magnetic poles P1 and the virtual magnetic poles P2. The number of poles of the rotor 2 is 10. The magnetic poles P1 and P2 of the rotor 2 are arranged at equal intervals in the circumferential direction. A portion between the magnet magnetic pole P1 and the virtual magnetic pole P2 is a pole boundary M.

The outer circumference of the rotor core 21 has a so-called flower shape such that the outer diameter of the rotor core 21 is maximum at a pole center of each of the magnetic poles P1 and P2 and is minimum at the pole boundary M. The outer circumference of the rotor core 21 is not limited to the flower shape and may be a circular shape.

Although the number of poles of the rotor 2 is 10 in this example, the number of poles of the rotor 2 only needs to be an even number of four or more. Moreover, although one magnet 23 is disposed in each magnet insertion hole 22 in this example, two or more magnets 23 may be disposed in each magnet insertion hole 22.

The non-magnetic resin portion 25 is provided between the rotation shaft 11 and the rotor core 21. The resin portion 25 is desirably composed of a thermoplastic resin such as polybutylene terephthalate (PBT). The resin portion 25 includes an annular inner cylindrical portion 25a fixed to the rotation shaft 11, an annular outer cylindrical portion 25c fixed to the rotor core 21, and a plurality of ribs 25b connecting the inner cylindrical portion 25a and the outer cylindrical portion 25c.

The rotation shaft 11 is fixed to an inner side of the inner cylindrical portion 25a of the resin portion 25. The ribs 25b are arranged at equal intervals in the circumferential direction and extend radially from the inner cylindrical portion 25a to the outer side in the radial direction. A hollow portion 26 is famed between the ribs 25b adjacent to each other in the circumferential direction. In this example, the number of ribs 25b is half the number of poles, and a position of each rib 25b in the circumferential direction is aligned with the pole center of the virtual magnetic pole P2, but the number and arrangement of the ribs 25b are not limited thereto.

As illustrated in FIG. 1, a sensor magnet 24 is disposed to face the rotor core 21 in the axial direction. The sensor magnet 24 is held by the resin portion 25. A magnetic field of the sensor magnet 24 is detected by a magnetic sensor mounted on the circuit board 6, whereby a position of the rotor 2 in the circumferential direction, i.e., a rotational position of the rotor 2 is detected.

(Configuration of Mold Stator 4)

Figure 3:
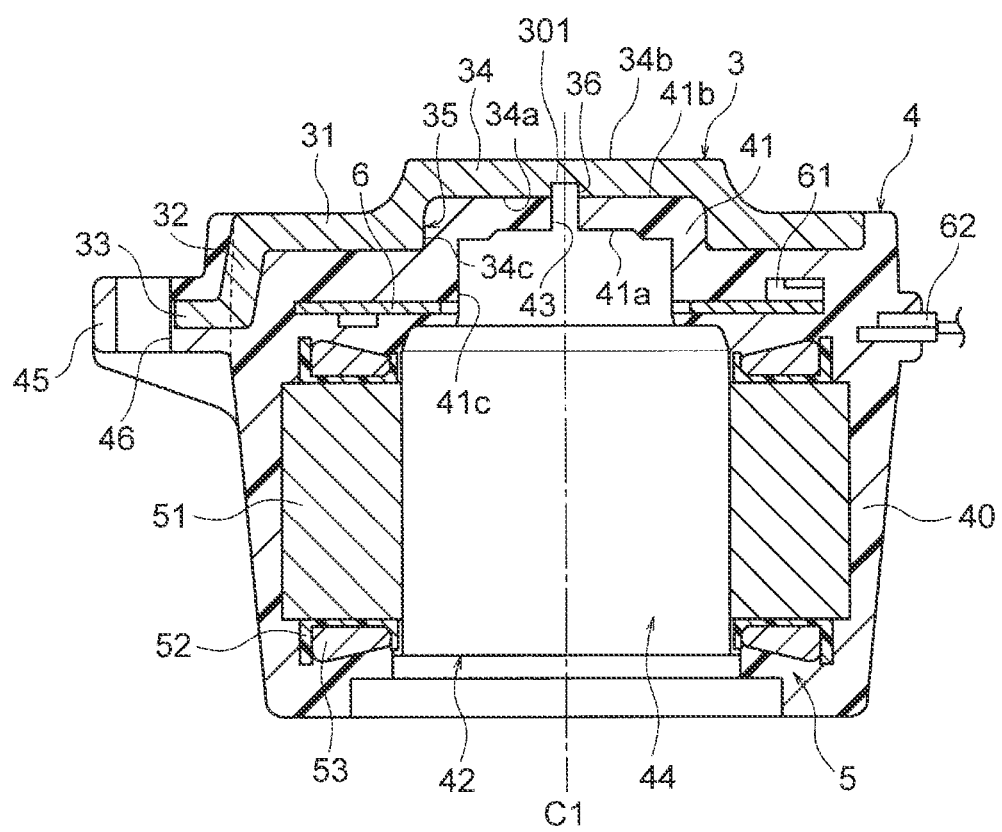
FIG. 3 is a sectional view illustrating a mold stator of the first embodiment.

FIG. 3 is a sectional view illustrating the mold stator 4. As described above, the mold stator 4 includes the stator 5, the circuit board 6, the heat dissipation member 3, and the mold resin portion 40. The stator 5 includes a stator core 51, an insulating portion 52 provided on the stator core 51, and coils 53 wound on the stator core 51 via the insulating portion 52.

The stator core 51 is famed of a plurality of stacking elements that are stacked in the axial direction and integrally fixed by crimping, welding, bonding, or the like. The stacking elements are, for example, electromagnetic steel sheets. Each of the stacking elements has a thickness of 0.1 mm to 0.7 mm.

The mold resin portion 40 is formed of a thermosetting resin such as a bulk molding compound (BMC). The mold resin portion 40 is formed to cover the stator 5, the circuit board 6, and the heat dissipation member 3.

The mold resin portion 40 includes a bearing holding portion 41 on the counter-load side and an opening 42 on the load side. A rotor housing portion 44, which is a space where the rotor 2 is housed, is famed between the bearing holding portion 41 and the opening 42. The rotor 2 (FIG. 1) is inserted into the rotor housing portion 44 through the opening 42.

A bearing 13, which is one of bearings supporting the rotation shaft 11, is supported by the bearing holding portion 41 of the mold resin portion 40. The bearing holding portion 41 will be described later.

A metal bracket 15 (FIG. 1) is attached to the opening 42. The other bearing 12 (FIG. 1) supporting the rotation shaft 11 is held by the bracket 15. A cap 14 (FIG. 1) for preventing the entry of water or the like is attached to the outside of the bracket 15.

Figure 4A:
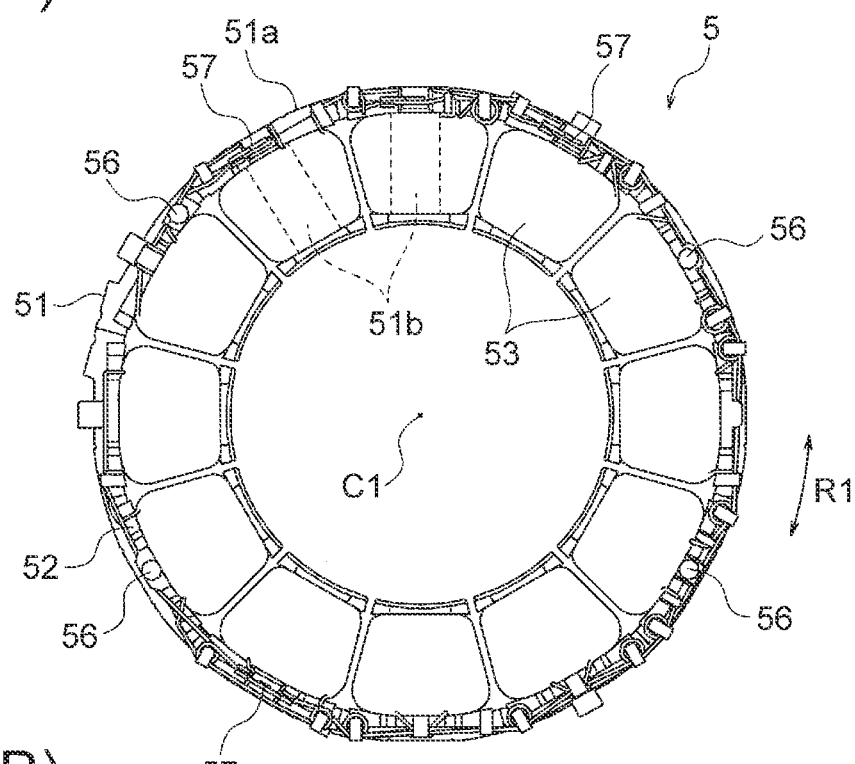
FIGS. 4(A) and 4(B) are respectively a plan view and a side view illustrating a stator of the first embodiment.
Figure 4B:
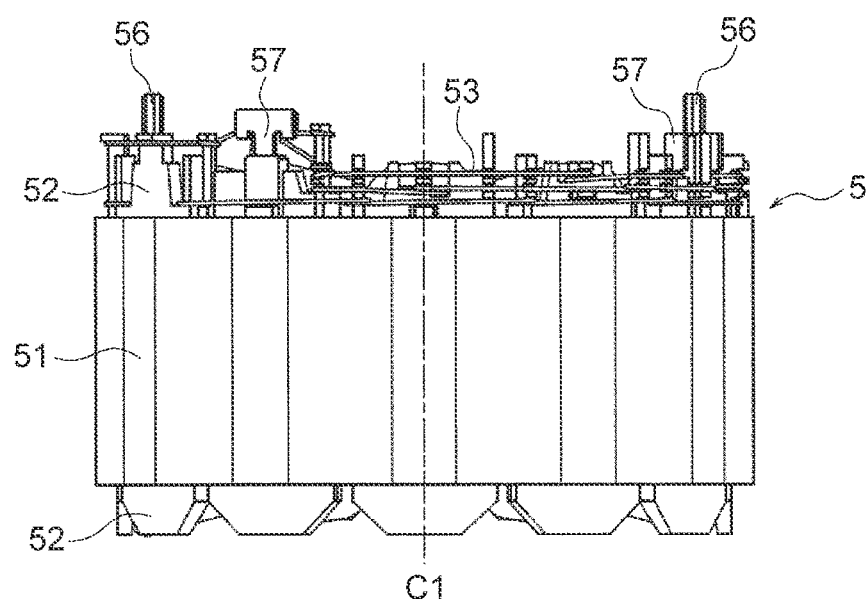

FIG. 4(A) is a plan view illustrating the stator 5. FIG. 4(B) is a side view illustrating the stator 5. The stator core 51 has a yoke 51a having an annular shape about the axis C1 and a plurality of teeth 51b extending inward in the radial direction from the yoke 51a. Although the number of teeth 51b is 12 in this example, the number of teeth 51b is not limited thereto. In FIG. 4(A), two of the teeth 51b are indicated by dashed lines.

The coil 53 is, for example, a magnet wire wound around the tooth 51b via the insulating portion 52. The insulating portion is famed of, for example, a thermoplastic resin such as polybutylene terephthalate (PBT). The insulating portion 52 is famed by molding the thermoplastic resin integrally with the stator core 51 or by assembling a molded body of the thermoplastic resin to the stator core 51.

The insulating portion 52 has wall portions on inner and outer sides of the coils 53 in the radial direction, and the wall portions guide the coils 53 from both sides in the radial direction. A plurality of terminals 57 are mounted to the insulating portion 52. Ends of the coils 53 are connected to the terminals 57 by, for example, fusing (thermal caulking), soldering, or the like.

The insulating portion 52 is also provided with a plurality of protrusions 56 for fixing the circuit board 6. The protrusions 56 are inserted through mounting holes famed in the circuit board 6.

As shown in FIG. 1, the circuit board 6 is disposed on one side of the stator 5 in the axial direction, i.e., the counter-load side of the stator 5 in this example. The circuit board 6 is a printed circuit board on which a driving circuit 61 such as a power transistor for driving the motor 1 is mounted, and lead wires 63 are wired on the circuit board 6. The lead wires 63 on the circuit board 6 are drawn out to the outside of the motor 1 through a lead wire outlet component 62 mounted on an outer circumferential portion of the mold resin portion 40.

Figure 5A:
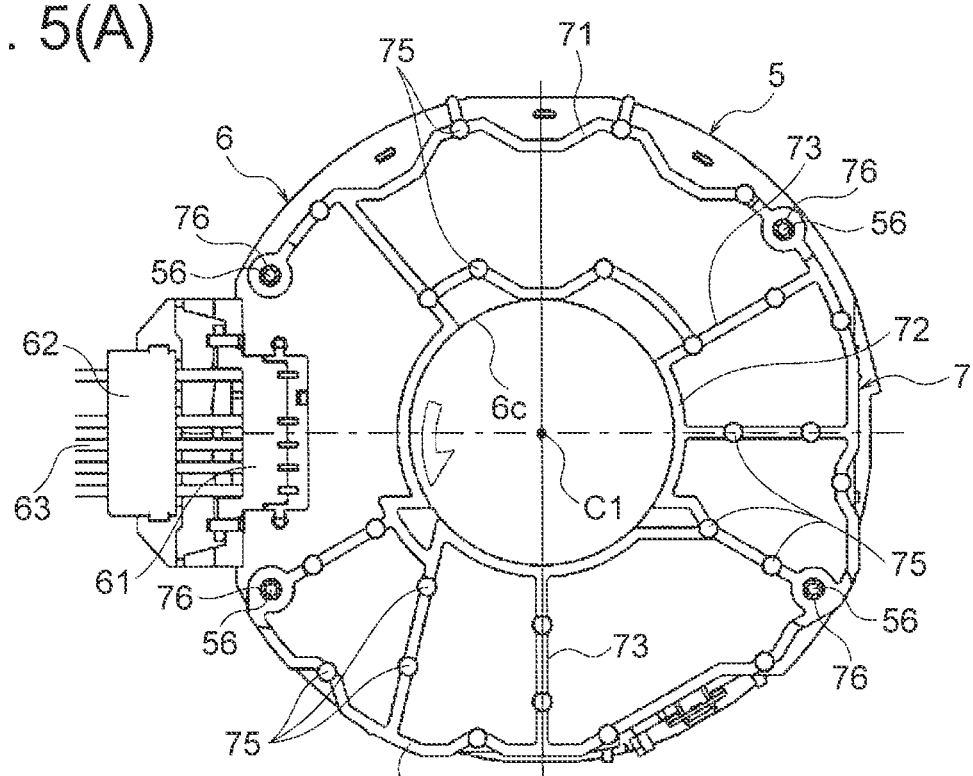
FIGS. 5(A) and 5(B) are respectively a plan view and a side view illustrating the stator, a circuit board, and a board holding member of the first embodiment.
Figure 5B:
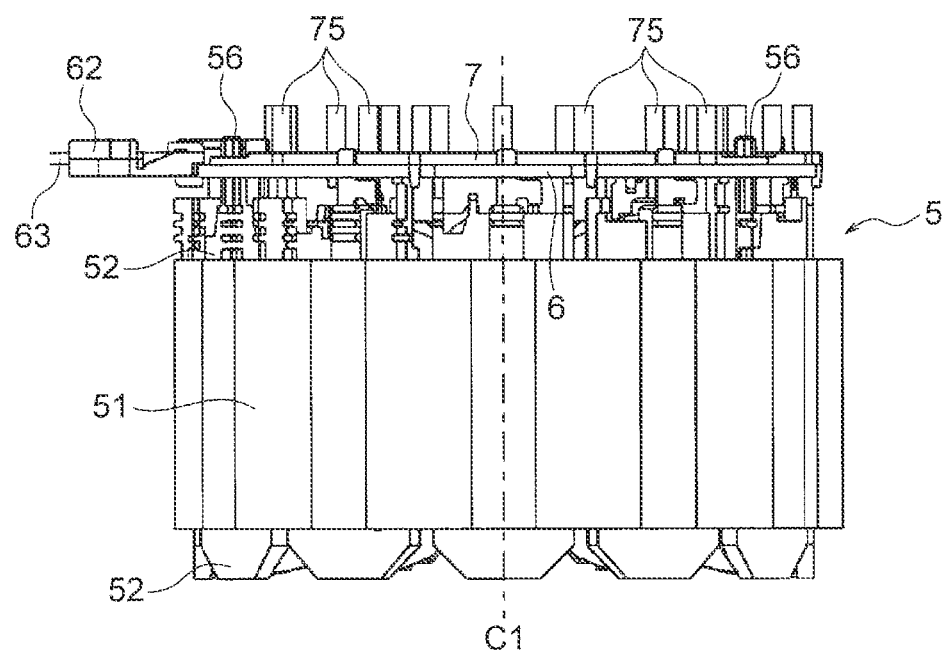

FIG. 5(A) is a plan view illustrating the stator 5, the circuit board 6, and a board holding member 7. FIG. 5(B) is a side view illustrating the stator 5, the circuit board 6, and the board holding member 7. The circuit board 6 is disposed so that its surface is perpendicular to the axial direction. An opening 6c for securing a space to house the bearing 13 (FIG. 1) is famed at a center of the circuit board 6 in the radial direction. The above-described lead wire outlet component 62 is mounted to an outer circumferential portion of the circuit board 6.

The board holding member 7 as a support member is provided on the side of the circuit board 6 opposite to the stator 5. The board holding member 7 is provided to suppress defamation of the circuit board 6 during molding and is composed of, for example, a resin such as PBT.

The board holding member 7 is in the form of a framework, and includes a rib 71 extending along the outer circumference of the circuit board 6, a rib 72 extending along the opening 6c of the circuit board 6, and ribs 73 connecting the ribs 71 and 72. The shape of the board holding member 7 is not limited to such a shape.

The board holding member 7 has mounting holes 76 through which the protrusions 56 of the insulating portion 52 are inserted. The protrusions 56 protrude through the mounting holes in the axial direction. By thermally or ultrasonically welding the protruding tips of the protrusions 56, the circuit board 6 and the board holding member 7 are fixed to the stator 5.

The board holding member 7 has a plurality of convex portions 75 that protrude on the side opposite to the stator 5. The convex portions 75 are formed on the ribs 71, 72, and 73 and are disposed to be distributed over the board holding member 7. The convex portions 75 serve as a support portion that supports the heat dissipation member 3.

(Configuration of Bearing Holding Portion 41)

Next, the bearing holding portion 41 of the mold resin portion 40 will be described. As illustrated in FIG. 3, the bearing holding portion 41 of the mold resin portion 40 has a first surface 41a facing the rotor housing portion 44 and a second surface 41b opposite to the first surface 41a. The first surface 41a and the second surface 41b are both perpendicular to the axial direction.

The bearing holding portion 41 has an inner circumferential surface 41c that is adjacent to the first surface 41a. The inner circumferential surface 41c has a cylindrical shape about the axis C1. The inner circumferential surface 41c is a cylindrical surface. The first surface 41a and the inner circumferential surface 41c form a concave portion. The bearing 13 (FIG. 1) is housed in this concave portion.

A through hole 43 is famed in the bearing holding portion 41. The through hole 43 extends from the first surface 41a to reach the second surface 41b. The through hole 43 is famed at a center of the bearing holding portion 41 in the radial direction and extends in the axial direction. A cross-sectional shape of the through hole 43 in a plane perpendicular to the axial direction is, for example, a circular shape.

(Configuration of Heat Dissipation Member 3)

Next, the heat dissipation member 3 will be described. The heat dissipation member 3 is provided on one side of the stator 5 in the axial direction (on an upper side in FIG. 3). The heat dissipation member 3 is composed of, for example, a metal such as aluminum. The heat dissipation member 3 includes a plate portion 31 and leg portions 32. The heat dissipation member 3 is also referred to as a heat dissipation plate.

The plate portion 31 extends in a plane perpendicular to the axial direction, while the leg portions 32 extend outward in the radial direction from an outer circumference of the plate portion 31. The plate portion 31 is covered with the mold resin portion 40 in such a manner that a surface of the plate portion 31 on the side opposite to the stator 5 is exposed to the outside.

The plate portion 31 has a protruding shape portion 34 at its center in the radial direction. The protruding shape portion 34 has a first surface 34a in contact with the second surface 41b of the bearing holding portion 41 and a second surface 34b opposite to the first surface 34a. The protruding shape portion 34 has an inner circumferential surface 34c that is adjacent to the first surface 34a. The inner circumferential surface 34c has a cylindrical shape about the axis C1.

The first surface 34a and the inner circumferential surface 34c form a first concave portion 35. The first concave portion 35 has a circular cross-section in a plane perpendicular to the axial direction and surrounds the bearing holding portion 41 of the mold resin portion 40 from an outer side in the radial direction.

A second concave portion 36 is formed on an inner side of the first concave portion 35 in the radial direction. The second concave portion 36 is a portion that is brought into engagement with a positioning pin 208 (FIG. 8) of a mold 200 during the molding. The second concave portion 36 is famed at a center of the first concave portion 35 in the radial direction. An inner diameter of the second concave portion 36 is smaller than that of the first concave portion 35. The second concave portion 36 has a circular cross-section in a plane perpendicular to the axial direction.

The second concave portion 36 extends in the axial direction from the first surface 34a toward the second surface 34b of the protruding shape portion 34. However, the second concave portion 36 does not reach the second surface 34b and has a bottom portion 301.

Figure 6:
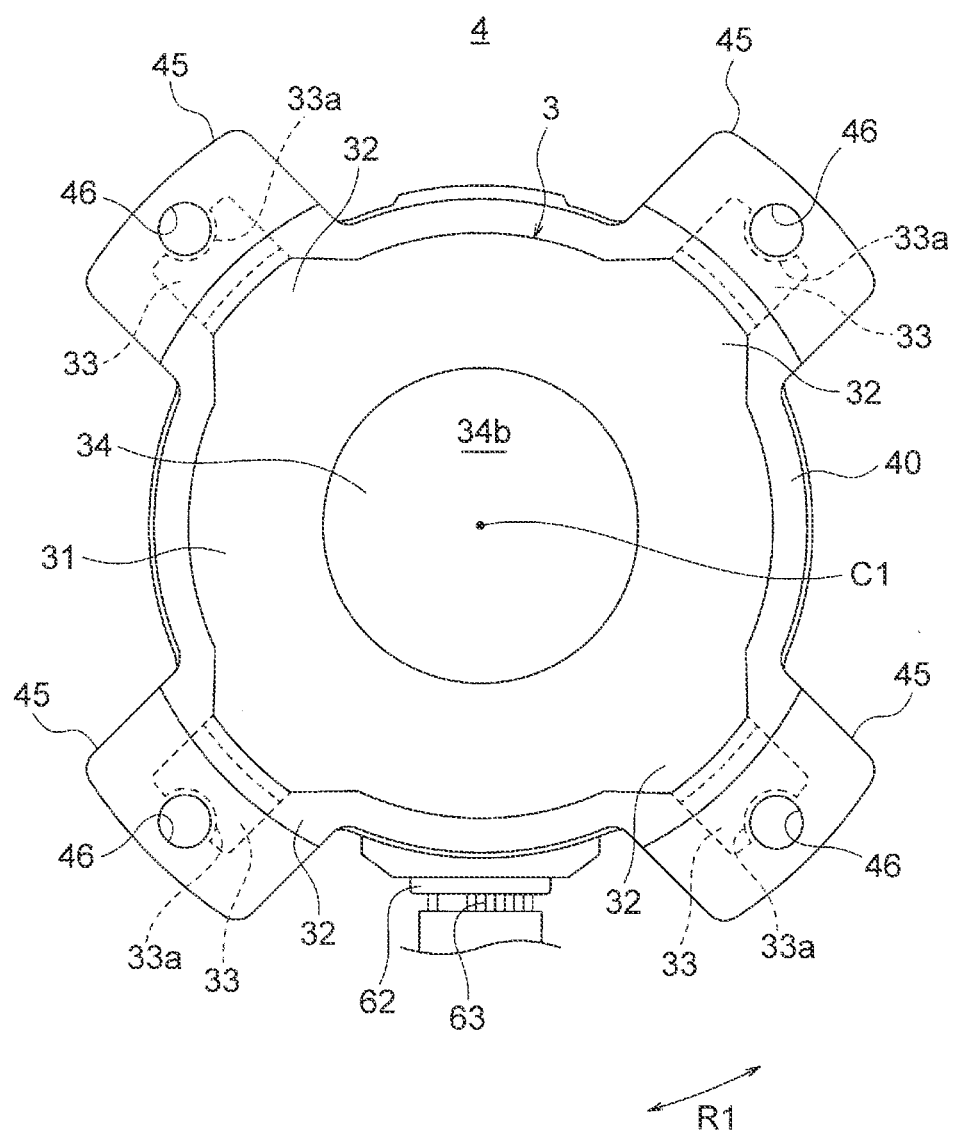
FIG. 6 is a diagram illustrating the mold stator of the first embodiment as viewed from a heat dissipation member side.

FIG. 6 is a diagram of the mold stator 4 as viewed from the heat dissipation member 3 side. As illustrated in FIG. 6, the plurality of leg portions 32 extend radially on the outer side of the plate portion 31 in the radial direction. The leg portions 32 are arranged at equal intervals about the axis C1. In this example, four leg portions 32 are arranged at intervals of 90 degrees about the axis C1. The number of leg portions 32 is not limited to four and only needs to be one or more.

A tip portion 33 on the outer side of each leg portion 32 in the radial direction is covered with the mold resin portion 40. A concave portion 33a is famed at the tip portion 33 of the leg portion 32. The concave portions 33a are portions that are brought into engagement with positioning pins 211 (FIG. 8) of the mold 200 during the molding. The inner circumferential surfaces of the concave portions 33a contact the positioning pins 211, whereby a position of the heat dissipation member 3 in the circumferential direction is determined.

The concave portions 33a are also used as insertion holes for screws for fixing the motor 1. Each concave portion 33a in this example has a semicircular shape that is opened outward in the radial direction, but the shape of the concave portion 33a is not limited to such a semicircular shape. Instead of the concave portion 33a, a hole may be formed.

The surface side of the plate portion 31 of the heat dissipation member 3 (including the protruding shape portion 34) is exposed to the outside from the mold resin portion 40, and is also referred to as an exposed portion. A portion of the heat dissipation member 3 except for the exposed portion is covered with the mold resin portion 40, and is also referred to as an embedded portion. The embedded portion includes, for example, the stator 5 side of the plate portion 31 (including the leg portions 32).

The mold resin portion 40 has mounting legs 45 at positions corresponding to the leg portions 32 of the heat dissipation member 3. In this example, four mounting legs 45 are famed at intervals of 90 degrees about the axis C1. The number of mounting legs 45 is not limited to four and only needs to be one or more.

Holes 46 are famed in the mounting legs 45. The holes 46 are famed in positions that overlap the concave portions 33a of the heat dissipation member 3 in the axial direction. The holes 46 are famed since a resin does not flow into portions where the positioning pins 211 of the mold 200 are located (FIG. 8) during the molding. The holes 46 are also used as insertion holes for screws for fixing the motor 1. Each hole 46 has a circular shape in this example, but the shape of the hole 46 is not limited to the circular shape. Instead of the hole 46, a concave portion may be famed.

Figure 7:
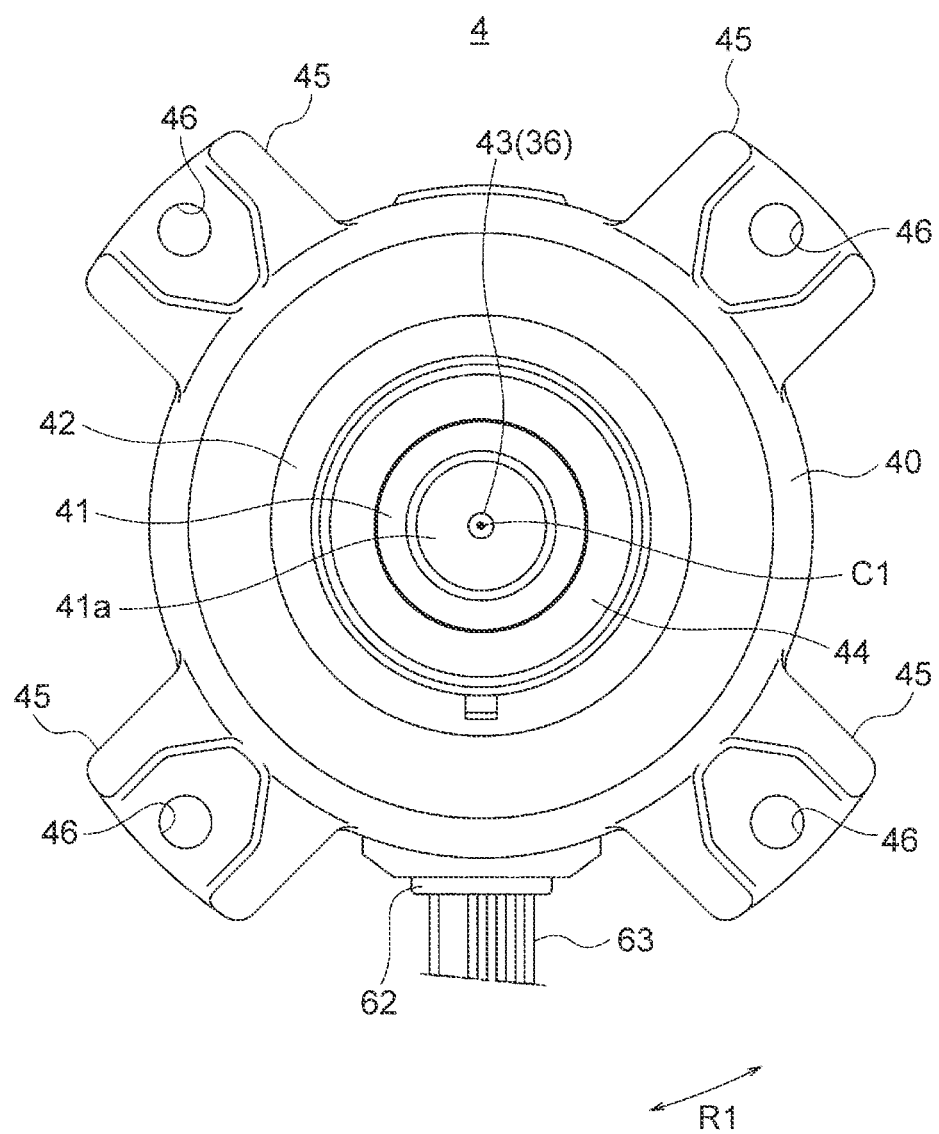
FIG. 7 is a diagram illustrating the mold stator of the first embodiment as viewed from an opening side.

FIG. 7 is a diagram of the mold stator 4 configured as above as viewed from the opening 42 side. When the mold stator 4 is viewed from the opening 42 side, the through hole 43 of the bearing holding portion 41 and the second concave portion 36 of the heat dissipation member 3 can be seen at a center of the rotor housing portion 44 in the radial direction.

(Manufacturing Method of Motor 1)

Figure 8:
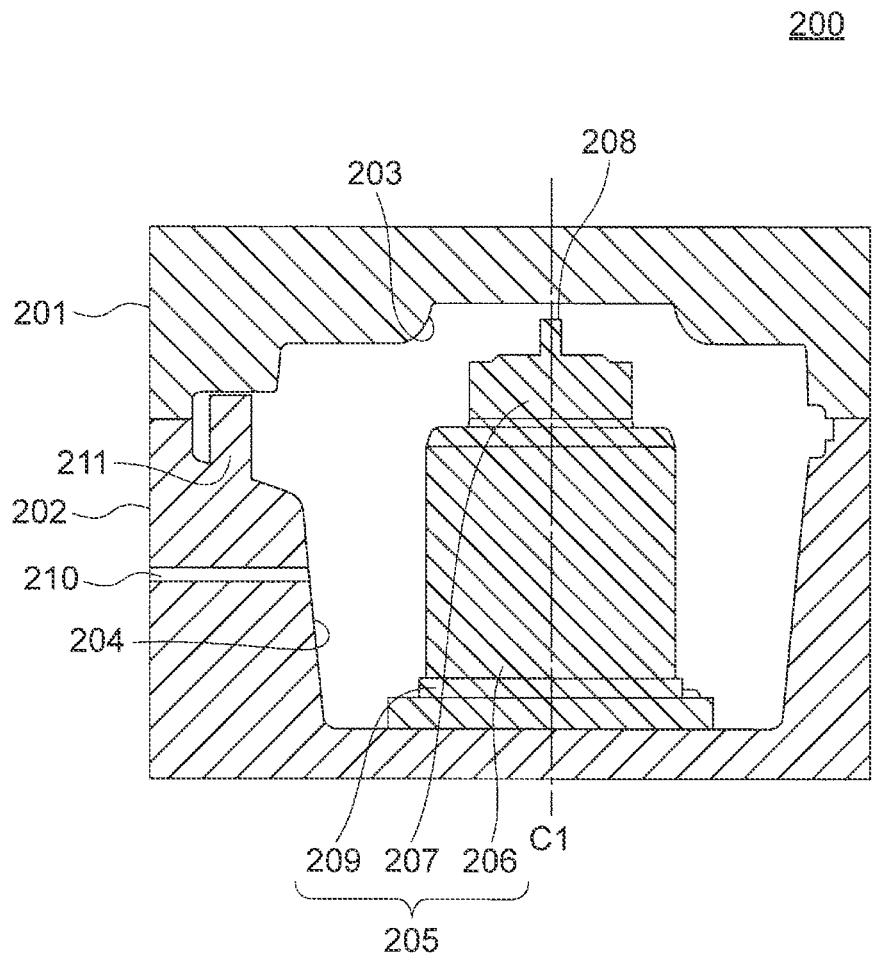
FIG. 8 is a sectional view illustrating a mold used in a manufacturing process of the motor of the first embodiment.

Next, a manufacturing process of the motor 1 will be described. FIG. 8 is a sectional view illustrating the mold 200 used in the manufacturing process of the motor 1. The mold 200 has an upper mold 201 and a lower mold 202 that can be opened and closed, and a cavity 204 is formed between the molds 201 and 202. The upper mold 201 is provided with a heat-dissipation-member housing portion 203 for housing the heat dissipation member 3.

The lower mold 202 has a center core 205 protruding in the cavity 204. The center core 205 extends in the axial direction from a bottom of the cavity 204. The center core 205 has a first center core portion 206 corresponding to the rotor housing portion 44 of the mold resin portion 40 and a second center core portion 207 corresponding to the concave portion of the bearing holding portion 41.

The positioning pin 208 as a positioning member is provided on an upper end of the second center core portion 207. The positioning pin 208 is famed at a center of the center core 205 in the radial direction and protrudes in the axial direction from the upper end of the second center core portion 207. The positioning pin 208 is brought into engagement with the second concave portion 36 (FIG. 3) of the heat dissipation member 3 to thereby position the heat dissipation member 3 in the axial direction and the radial directions.

A larger-diameter portion 209 is famed at a lower end of the center core 205, and the larger-diameter portion 209 overhangs outward in the radial direction from the center core 205. The larger-diameter portion 209 is a portion corresponding to the opening 42 (FIG. 3) of the mold stator 4.

A gate 210 is formed in the lower mold 202. The gate 201 is a flow passage through which a resin is injected into the cavity 204. The positioning pins 211 extending in the axial direction are famed at an outer circumferential portion of the cavity 204. The positioning pins 211 are brought into engagement with the concave portions 33a (FIG. 6) of the heat dissipation member 3 to thereby position the heat dissipation member 3 in the circumferential direction.

Figure 9:
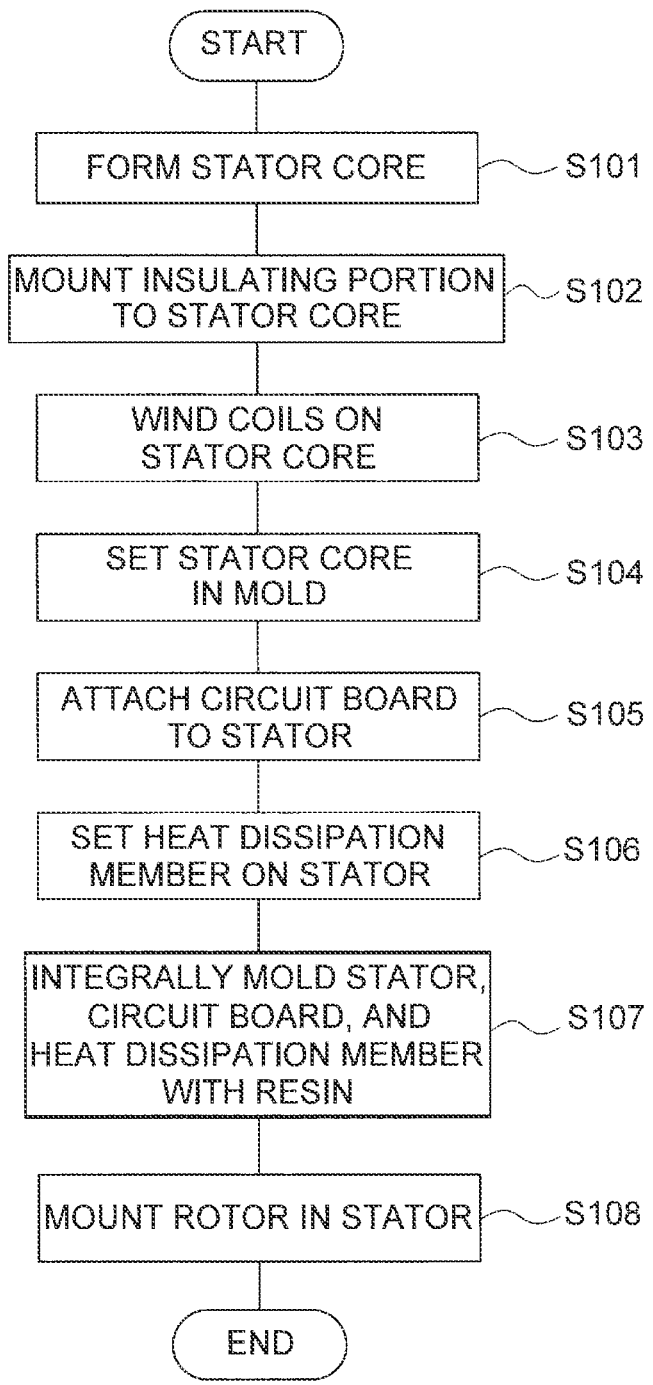
FIG. 9 is a flowchart illustrating the manufacturing process of the motor of the first embodiment.
Figure 10A:
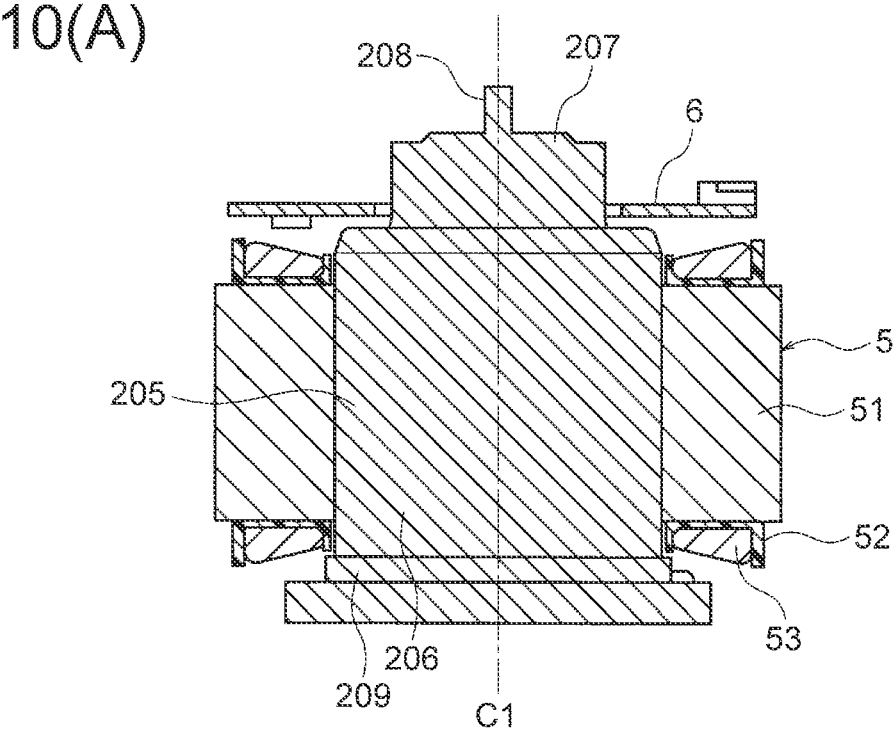
FIGS. 10(A) and 10(B) are diagrams illustrating steps of the manufacturing process of the motor of the first embodiment.
Figure 10B:
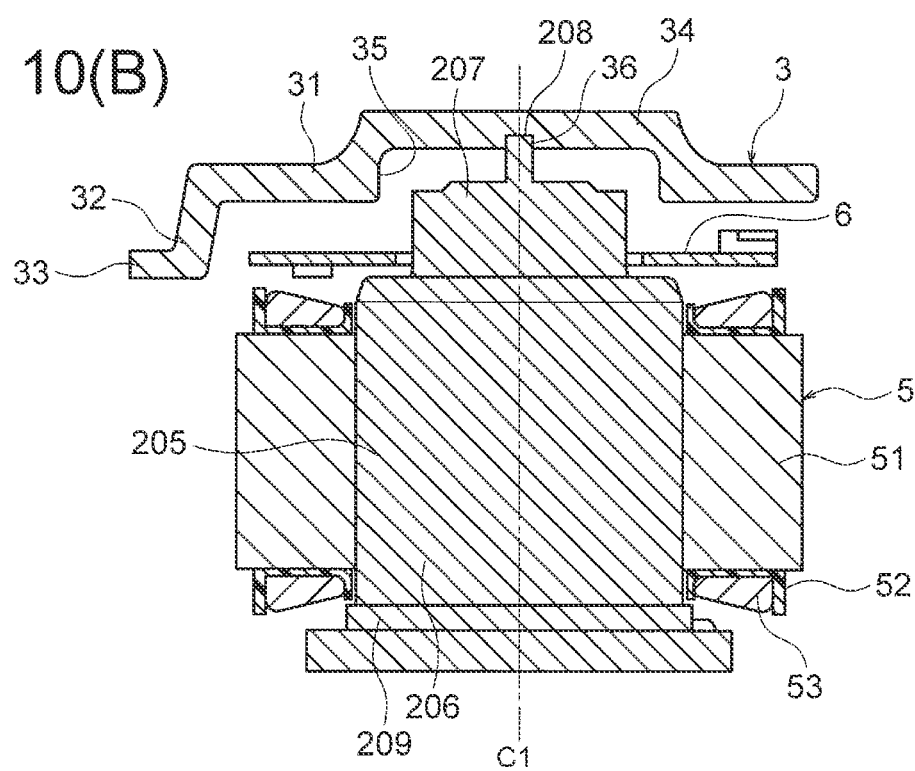
Figure 11:
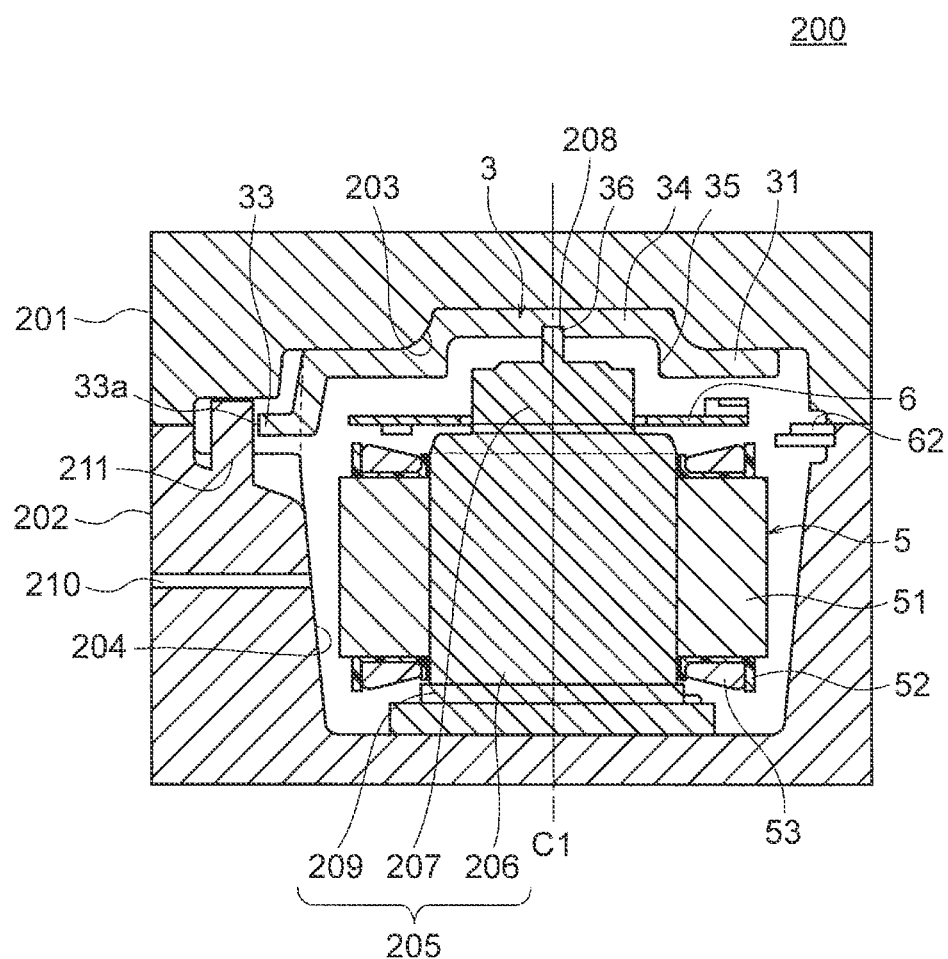
FIG. 11 is a diagram illustrating the manufacturing process of the motor of the first embodiment.

FIG. 9 is a flowchart illustrating the manufacturing process of the motor 1. FIGS. 10(A) and 10(B) and FIG. 11 are schematic diagrams illustrating steps of the manufacturing process of the motor 1.

First, a plurality of stacking elements are stacked in the axial direction and integrally fixed by crimping or the like, thereby forming the stator core 51 (step S101). Then, the insulating portion 52 is mounted to or molded integrally with the stator core 51 (step S102). Furthermore, the coils 53 are wound on the stator core 51 via the insulating portion 52 (step S103). In this way, the stator 5 is famed.

Next, the upper mold 201 of the mold 200 is moved upward to open the cavity 204, and the stator 5 is set in the cavity 204 (step S104). The stator 5 is mounted around the center core 205 of the mold 200 as illustrated in FIG. 10(A).

Then, the circuit board 6 and the board holding member 7 are mounted to the stator 5 (step S105). At this time, the protrusions 56 (FIG. 5(B)) of the insulating portion 52 of the stator 5 are inserted through the mounting holes of the circuit board 6 and the mounting holes 76 (FIG. 5(A)) of the board holding member 7, and then the tips of the protrusions 56 are welded thermally or the like, whereby the circuit board 6 and the board holding member 7 are fixed to the stator 5. The board holding member 7 is not illustrated in FIGS. 10(A) to FIG. 11.

Then, the heat dissipation member 3 is mounted on the stator 5 in the mold 200 (S106). At this time, the positioning pin 208 of the center core 205 is brought into engagement with the second concave portion 36 of the heat dissipation member 3 as illustrated in FIG. 10(B). Thus, the heat dissipation member 3 is positioned in the axial direction and the radial direction with respect to the mold 200.

Further, the positioning pins 211 of the mold 200 (FIG. 11) are brought into engagement with the concave portions 33a (FIG. 11) of the tip portions 33 of the heat dissipation member 3. Thus, the heat dissipation member 3 is positioned in the circumferential direction with respect to the mold 200.

Next, as illustrated in FIG. 11, the upper mold 201 is moved downward to close the cavity 204, and then molding is performed (step S107). That is, a mold resin in a molten state is injected into the cavity 204 through the gate 210. The mold resin injected into the cavity 204 covers the stator 5, the circuit board 6, and the board holding member 7, and further covers a part of the heat dissipation member 3.

In a case where a thermosetting resin is used as the mold resin, after injecting the mold resin into the cavity 204, the mold resin in the cavity 204 is hardened by heating the mold 200. In this way, the mold resin portion 40 is famed. That is, the mold stator 4 in which the mold resin portion 40 covers the stator 5, the circuit board 6, and the board holding member 7 is famed.

In the formation of the bearing holding portion 41 of the mold resin portion 40, the resin does not flow into a portion corresponding to the positioning pin 208, and thus the through hole 43 is formed in the bearing holding portion 41. The through hole 43 of the bearing holding portion 41 is famed in a position that overlaps the second concave portion 36 of the heat dissipation member 3 in the axial direction.

Similarly, in the formation of the mounting legs 45 of the mold resin portion 40, the resin does not flow into portions corresponding to the positioning pins 211, and thus the holes 46 are famed in the mounting legs 45. The holes 46 of the mounting leg 45 are famed at positions that overlap the concave portions 33a of the heat dissipation member 3 in the axial direction.

Aside from steps S101 to S107, the rotor 2 is famed. That is, a plurality of stacking elements are stacked in the axial direction and integrally fixed by crimping or the like, thereby forming the rotor core 21. Then, the magnets 23 are inserted into the magnet insertion holes 22. Furthermore, the rotation shaft 11, the rotor core 21, the magnets 23, and the sensor magnet 24 are integrally formed with a resin which forms the resin portion 25. In this way, the rotor 2 is formed.

Thereafter, the bearings 12 and 13 are mounted to the rotation shaft 11 of the rotor 2, and then the rotor 2 is inserted into the rotor housing portion 44 through the opening 42 of the mold stator 4 (step S108). Further, the bracket 15 is attached to the opening 42 of the mold stator 4, and the cap 14 is attached to the outside of the bracket 15. Consequently, the motor 1 is completed.

(Functions)

The heat dissipation member 3 has a function to efficiently dissipate heat generated by the driving circuit 61 of the circuit board 6 and the coils 53 to the outside of the motor 1, thereby suppressing an increase in the temperature of the motor 1. Since a part of the heat dissipation member 3 is covered with the mold resin portion 40, a contact thermal resistance between the mold resin portion 40 and the heat dissipation member 3 can be reduced, as compared to a case in which the heat dissipation member 3 is attached to the mold stator 4 from the outside. Thus, heat dissipation property can be enhanced.

Since the heat dissipation member 3 has the second concave portion 36 on the inner side of the first concave portion 35 in the radial direction, the heat dissipation member 3 can be positioned with respect to a center of the mold 200 in the radial direction by bringing the positioning pin 208 of the mold 200 into engagement with the second concave portion 36. Thus, the stator 5 and the heat dissipation member 3 can be positioned with high accuracy. As a result, vibration and noise due to misalignment between the stator 5 and the heat dissipation member 3 can be suppressed.

Since the mold resin portion 40 is provided to cover a part of the heat dissipation member 3, the resin fills in uneven portions on the surface of the heat dissipation member 3. Thus, voids between the mold resin portion 40 and the heat dissipation member 3 can be reduced, and the heat dissipation property can be enhanced.

The surface side of the heat dissipation member 3 (including the protruding shape portion 34) is exposed to the outside from the mold resin portion 40, so that heat can be effectively dissipated to the outside of the mold stator 4, and the heat dissipation effect can be further enhanced.

In addition, the heat dissipation member 3 is molded together with the stator 5 using the resin, and thus it is possible to eliminate a step of screwing, press-fitting or the like for fixing the heat dissipation member 3. Thus, the number of steps in the manufacturing process can be reduced.

The heat dissipation member 3 is exposed to the rotor housing portion 44 via the through hole 43 of the bearing holding portion 41, but the rotor 2 is housed in the rotor housing portion 44. Thus, the heat dissipation member 3 can be prevented from being deteriorated with time due to contact with water or the like.

Effects of Embodiment

As described above, the motor 1 of the first embodiment includes the rotor 2 having the rotation shaft 11 and the bearings 12 and 13, the stator 5 surrounding the rotor 2, the heat dissipation member 3 disposed on one side of the rotor 2 in the axial direction, and the mold resin portion 40 covering the stator 5 and at least a part of the heat dissipation member 3. Thus, heat generated by the motor 1 can be efficiently dissipated from the heat dissipation member 3 to the outside, and thus an increase in the temperature of the motor 1 can be suppressed.

The heat dissipation member 3 has the first concave portion 35 surrounding the bearing 13 from the outer side in the radial direction, and the second concave portion 36 famed on the inner side of the first concave portion 35 in the radial direction. Thus, the heat dissipation member 3 can be positioned with respect to the mold 200 with high accuracy by bringing the positioning pin 208 of the mold 200 into engagement with the second concave portion 36 of the heat dissipation member 3. Thus, the positioning accuracy of the heat dissipation member 3 with respect to the stator 5 can be enhanced, and vibration and noise can be suppressed.

The first concave portion 35 is famed to surround the bearing holding portion 41 from an outer side in the radial direction. Thus, a housing space for the bearing holding portion 41 holding the bearing 13 can be secured, and the mold stator 4 can be made compact.

The second concave portion 36 is located on an extension line of the axis C1 of the rotation shaft 11, and thus the heat dissipation member 3 can be positioned with respect to the center of the mold 200 in the radial direction with high accuracy.

In addition, since the second concave portion 36 has a circular cross-section, the positioning pin 208 of the mold 200 brought into engagement with the second concave portion 36 can be made in a simple shape. Thus, the manufacturing cost can be reduced.

A portion of the heat dissipation member 3 is exposed from the mold resin portion 40, while the other portion of the heat dissipation member 3 is covered with the mold resin portion 40. Thus, heat generated by the stator 5 or the like can be efficiently transferred to the heat dissipation member 3, and efficiently dissipated from the heat dissipation member 3 to the outside.

Since the circuit board 6 is provided between the stator 5 and the heat dissipation member 3, heat generated by the circuit board 6 can be efficiently dissipated from the heat dissipation member 3 to the outside.

Figure 25:
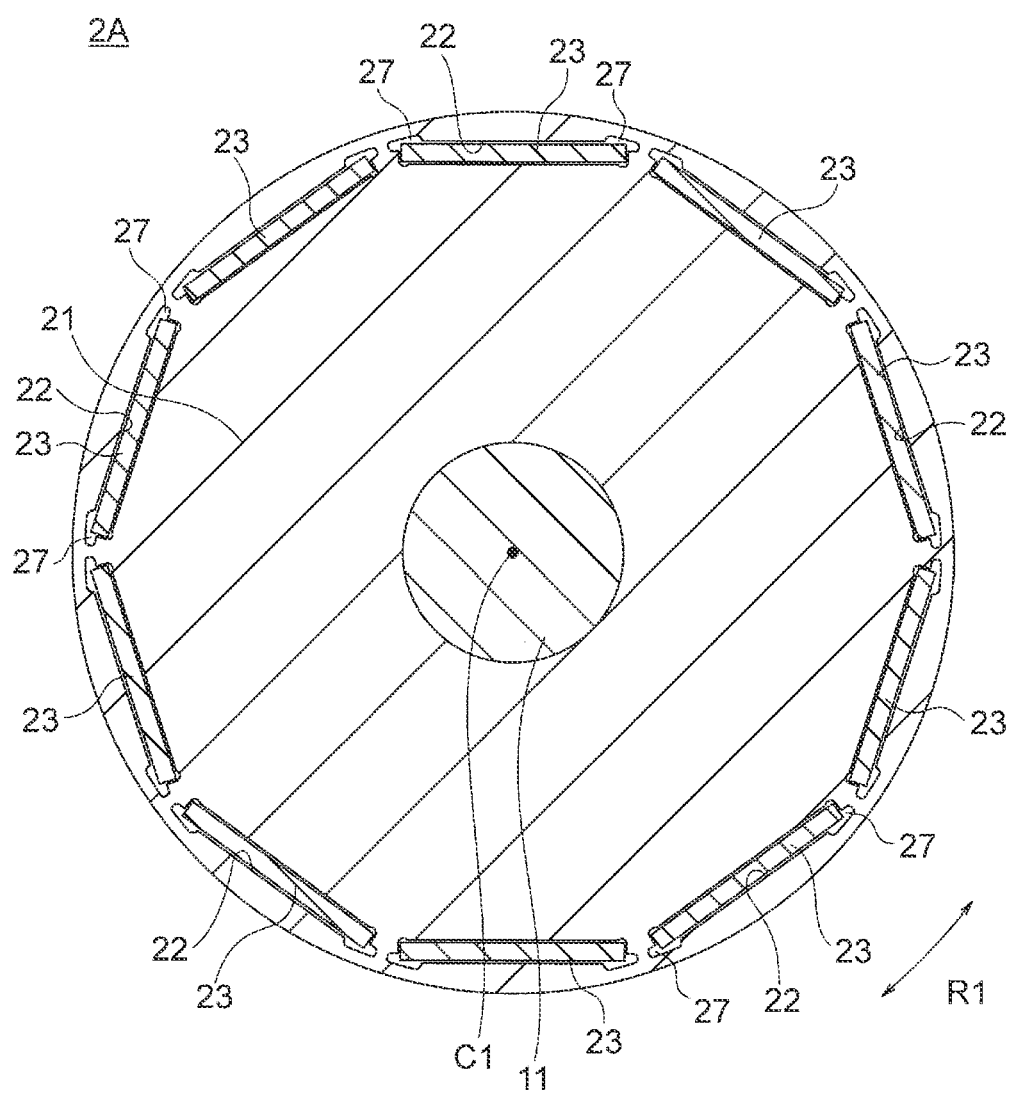
FIG. 25 is a sectional view illustrating another configuration example of a rotor.

The rotor 2 is of a consequent-pole type, and has half the number of magnets 23 as compared to a non-consequent-pole rotor 2A (see FIG. 25). Thus, a size of each magnet 23 made of a rare earth magnet with high magnetic force can be increased. Therefore, the magnetic force of the magnets 23 can be increased, and the machining cost of the magnets 23 can be reduced. In other words, it is possible to increase the output of the motor 1 and reduce the size of the motor 1, while reducing the manufacturing cost of the motor 1.

Meanwhile, as the output of the motor 1 increases and the size of the motor 1 decreases, the output density of the motor 1 increases, and thus the amount of heat generated by the motor 1 increases. In the first embodiment, the heat can be efficiently dissipated to the outside via the heat dissipation member 3, and thus it is possible to increase the output of the motor 1 and reduce the size of the motor 1, while suppressing an increase in the temperature of the motor 1.

In the case of the consequent-pole rotor 2, the magnetic attractive force acting between the rotor 2 and the teeth 51b of the stator 5 tends to be larger at the magnet magnetic pole P1 and smaller at the virtual magnetic pole P2. Thus, the rotor 2 is subjected to an excitation force in the radial direction during rotation, which tends to cause vibration and noise. However, since the heat dissipation member 3 is positioned with respect to the stator 5 with high accuracy as described above, the increase in vibration and noise can be suppressed.

Second Embodiment

Figure 12:
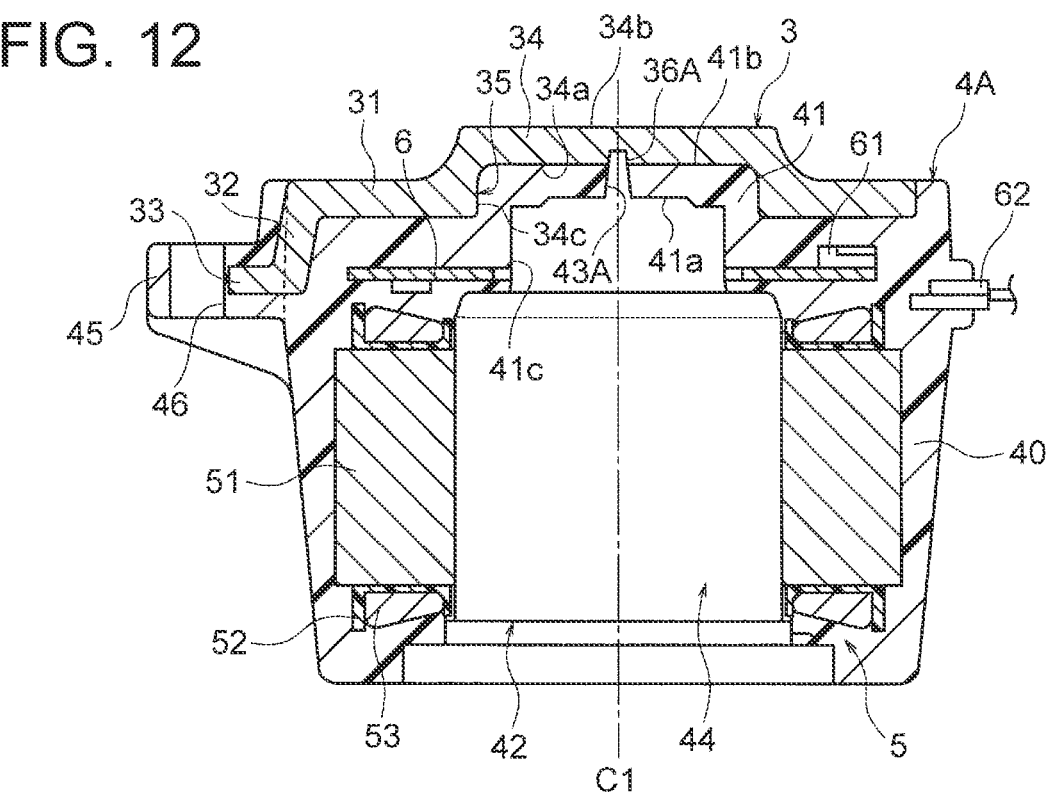
FIG. 12 is a sectional view illustrating a mold stator of a second embodiment.

Next, a second embodiment will be described. FIG. 12 is a sectional view illustrating a mold stator 4A of the second embodiment. The mold stator 4A of the second embodiment differs from the mold stator 4 of the first embodiment in the shapes of a second concave portion 36A of the heat dissipation member 3 and a through hole 43A of the bearing holding portion 41.

In the first embodiment described above, the second concave portion 36 of the heat dissipation member 3 and the through hole 43 of the bearing holding portion 41 are both cylindrical. In contrast, the second concave portion 36A of the heat dissipation member 3 and the through hole 43A of the bearing holding portion in the second embodiment both have inner circumferential surfaces inclined with respect to the axial direction.

Figure 13:
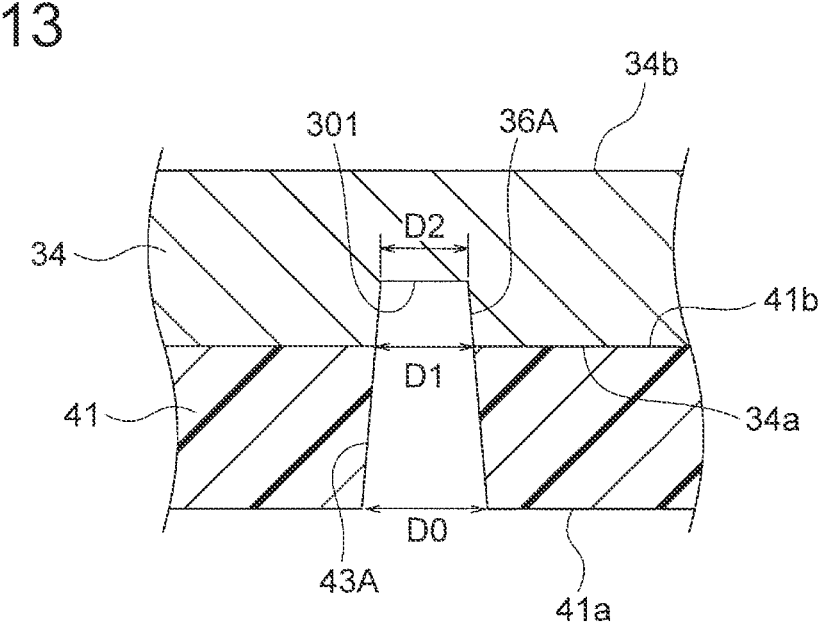
FIG. 13 is an enlarged sectional view illustrating a part of the mold stator of the second embodiment.

FIG. 13 is an enlarged sectional view illustrating the second concave portion 36A of the heat dissipation member 3 and the through hole 43A of the bearing holding portion 41. The second concave portion 36A of the heat dissipation member 3 extends from the first surface 34a of the protruding shape portion 34 toward the second surface 34b, but does not reach the second surface 34b. The second concave portion 36A has a bottom portion 301.

The second concave portion 36A has the inner circumferential surface inclined so that an inner diameter D1 at the first surface 34a is larger than an inner diameter D2 at the bottom portion 301. In other words, the second concave portion 36A has the inner circumferential surface inclined so that the inner diameter D1 at the end closer to the rotor housing portion 44 is larger than the inner diameter D2 at the end farther from the rotor housing portion 44. That is, the second concave portion 36A has the inner circumferential surface inclined so that a cross-sectional area of the second concave portion 36A decreases as a distance from the rotor housing portion 44 in the axial direction increases.

The through hole 43A has the inner circumferential surface inclined so that an inner diameter D0 at the first surface 41a is larger than the inner diameter D1 at the second surface 41b. In other words, the through hole 43A has the inner circumferential surface inclined so that a cross-sectional area of the through hole 43A decreases as a distance from the rotor housing portion 44 in the axial direction increases.

In the second embodiment, the positioning pin 208 (FIG. 8) of the mold 200 is inclined in the same manner as the second concave portion 36A. This facilitates engagement between the second concave portion 36A and the positioning pin 208. In addition, aligning function is obtained by contact between the second concave portion 36A and the positioning pin 208, and thus the coaxiality between the heat dissipation member 3 and the stator 5 can be improved.

The through hole 43A is famed since the resin does not flow into a portion corresponding to the positioning pin 208 (FIG. 8) of the mold 200. Thus, the inner circumferential surface of the through hole 43A is inclined at the same angle as the inner circumferential surface of the second concave portion 36A. Accordingly, each of the through hole 43A and the positioning pin 208 has a draft angle, and mold releasability when the mold stator 4A is removed from the mold 200 can be improved.

The motor of the second embodiment is configured in a similar manner to the motor 1 of the first embodiment except for the points described above.

As described above, in the motor of the second embodiment, the inner circumferential surface of the second concave portion 36A is inclined with respect to the axial direction, and thus the engagement between the second concave portion 36A and the positioning pin 208 of the mold 200 is facilitated. Therefore, the heat dissipation member 3 can be easily set in the mold 200, and the manufacturing process can be simplified.

In particular, since the second concave portion 36A has an inclination such that the inner diameter D1 at the first surface 34a is larger than the inner diameter D2 at the bottom portion 301, the through hole 43A and the positioning pin 208 have the draft angles. Thus, the mold releasability when the mold stator 4A is removed from the mold 200 can be improved. In addition, since the aligning function is obtained by contact between the second concave portion 36A and the positioning pin 208, the coaxiality between the heat dissipation member 3 and the stator 5 can be improved.

Modification

Figure 14:
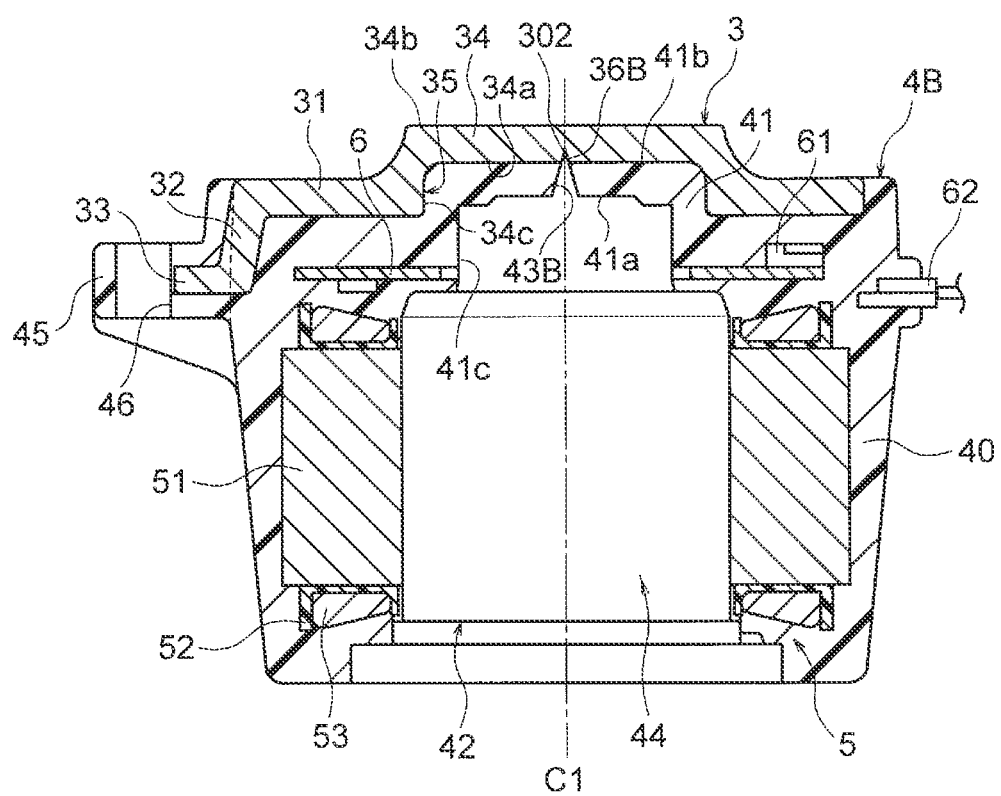
FIG. 14 is a sectional view illustrating a mold stator of a modification of the second embodiment.

FIG. 14 is a sectional view illustrating a mold stator 4B of a modification of the second embodiment. In the above-described example illustrated in FIG. 12, the second concave portion 36A has the flat bottom portion 301. In contrast, in the modification illustrated in FIG. 14, a second concave portion 36B has a point-like bottom portion 302. That is, the second concave portion 36B has a conical shape. The shape of a through hole 43B is similar to that of the through hole 43A of the second embodiment.

Also in this modification, an inner circumferential surface of the second concave portion 36B is inclined with respect to the axial direction, and thus the engagement between the second concave portion 36B and the positioning pin 208 (FIG. 8) of the mold 200 is facilitated. In addition, the mold releasability when the mold stator 4B is removed from the mold 200 can be improved, and thus the manufacturing process can be simplified.

Third Embodiment

Figure 15A:
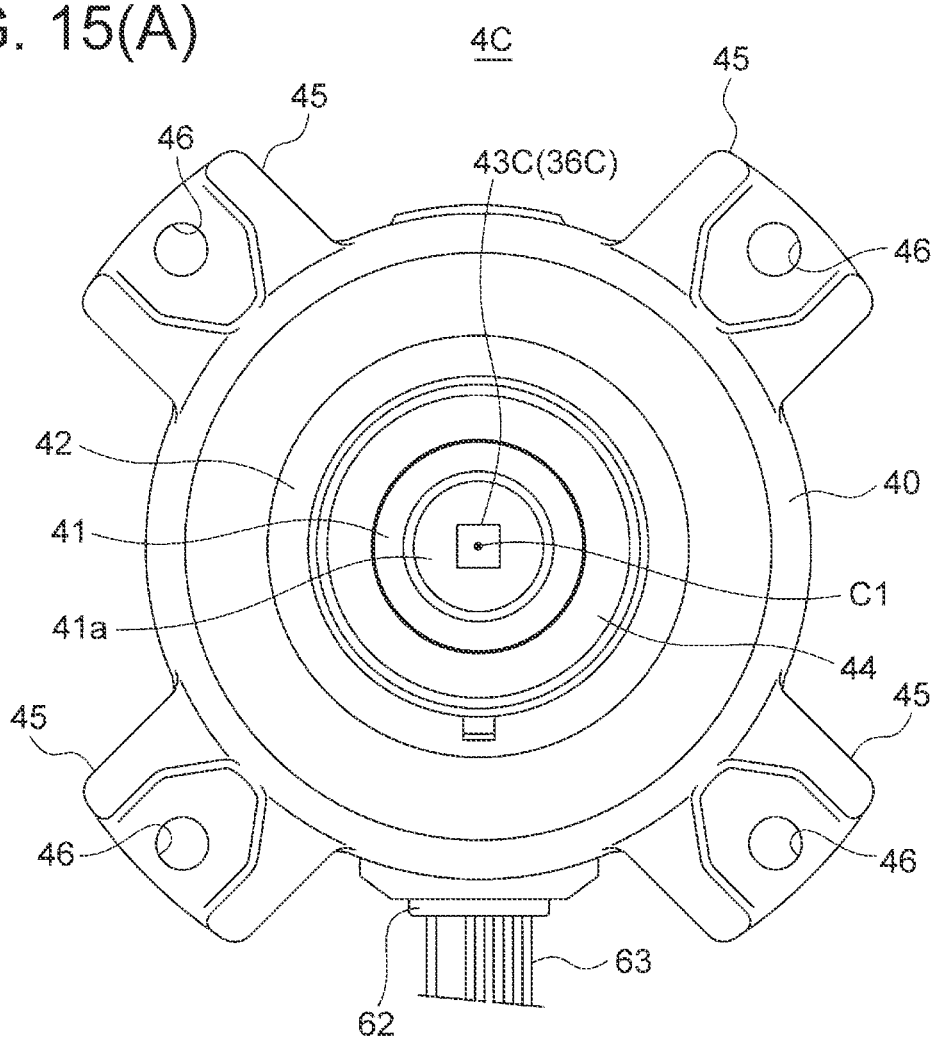
FIG. 15(A) is a diagram of a mold stator of a third embodiment as viewed from an opening side.

Next, a third embodiment will be described. FIG. 15(A) is a diagram of a mold stator 4C of the third embodiment as viewed from the opening 42 side. The mold stator 4C of the third embodiment differs from the mold stator 4 of the first embodiment in the shapes of a second concave portion 36C of the heat dissipation member 3 and a through hole 43C of the bearing holding portion 41.

In the first embodiment described above, the second concave portion 36 of the heat dissipation member 3 has the circular cross-section. In contrast, the second concave portion 36C of the heat dissipation member 3 of the third embodiment has a polygonal cross-section, for example, a quadrilateral cross-section. The cross-sectional shape of the second concave portion 36C is not limited to a quadrilateral shape, but may be a triangular shape, a pentagonal shape, or other polygonal shapes.

The through hole 43C of the bearing holding portion 41 has a polygonal cross-section similar to that of the second concave portion 36C. The through hole 43C of the bearing holding portion 41 is formed since the resin does not flow into a portion where the positioning pin 208 of the mold 200 (FIG. 8) is located.

In the third embodiment, the positioning pin 208 (FIG. 8) of the mold 200 has a polygonal shape similar to that of the second concave portion 36C. By engagement between the second concave portion 36C and the positioning pin 208 which are both polygonal, rotation of the heat dissipation member 3 within the mold 200 is prevented.

Figure 15B:
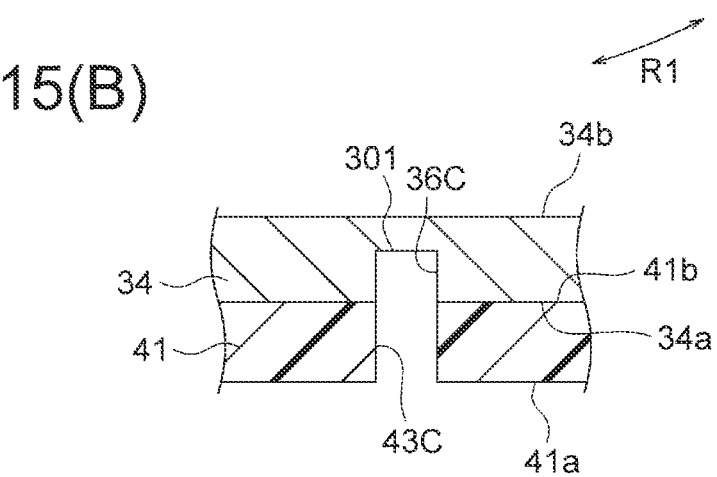
FIG. 15(B) is an enlarged diagram illustrating a part of the mold stator.

FIG. 15(B) is an enlarged sectional view illustrating the second concave portion 36C of the heat dissipation member 3 and the through hole 43C of the bearing holding portion 41. The second concave portion 36C of the heat dissipation member 3 extends from the first surface 34a toward the second surface 34b of the protruding shape portion 34 and has the bottom portion 301. The through hole 43c of the bearing holding portion 41 extends from the first surface 41a to reach the second surface 41b.

The second concave portion 36C has a cross-sectional area which is constant in the axial direction in this example, but the second concave portion 36C may be inclined so that its cross-sectional area decreases as the distance from the rotor housing portion 44 in the axial direction increases as described in the second embodiment. The second concave portion 36C may have a point-like bottom portion such as that illustrated in FIG. 14.

Similarly, the through hole 43C has a cross-sectional area which is constant in the axial direction in this example, but the through hole 43C may be inclined so that its cross-sectional area decreases as the distance from the rotor housing portion 44 in the axial direction increases as described in the second embodiment.

The motor of the third embodiment is configured in a similar manner to the motor 1 of the first embodiment except for the points described above.

As described above, in the third embodiment, since the second concave portion 36C of the heat dissipation member 3 has the polygonal shape, the rotation of the heat dissipation member 3 within the mold 200 can be prevented by the engagement between the polygonal positioning pin 208 of the mold 200 and the second concave portion 36C.

Fourth Embodiment

Figure 16A:
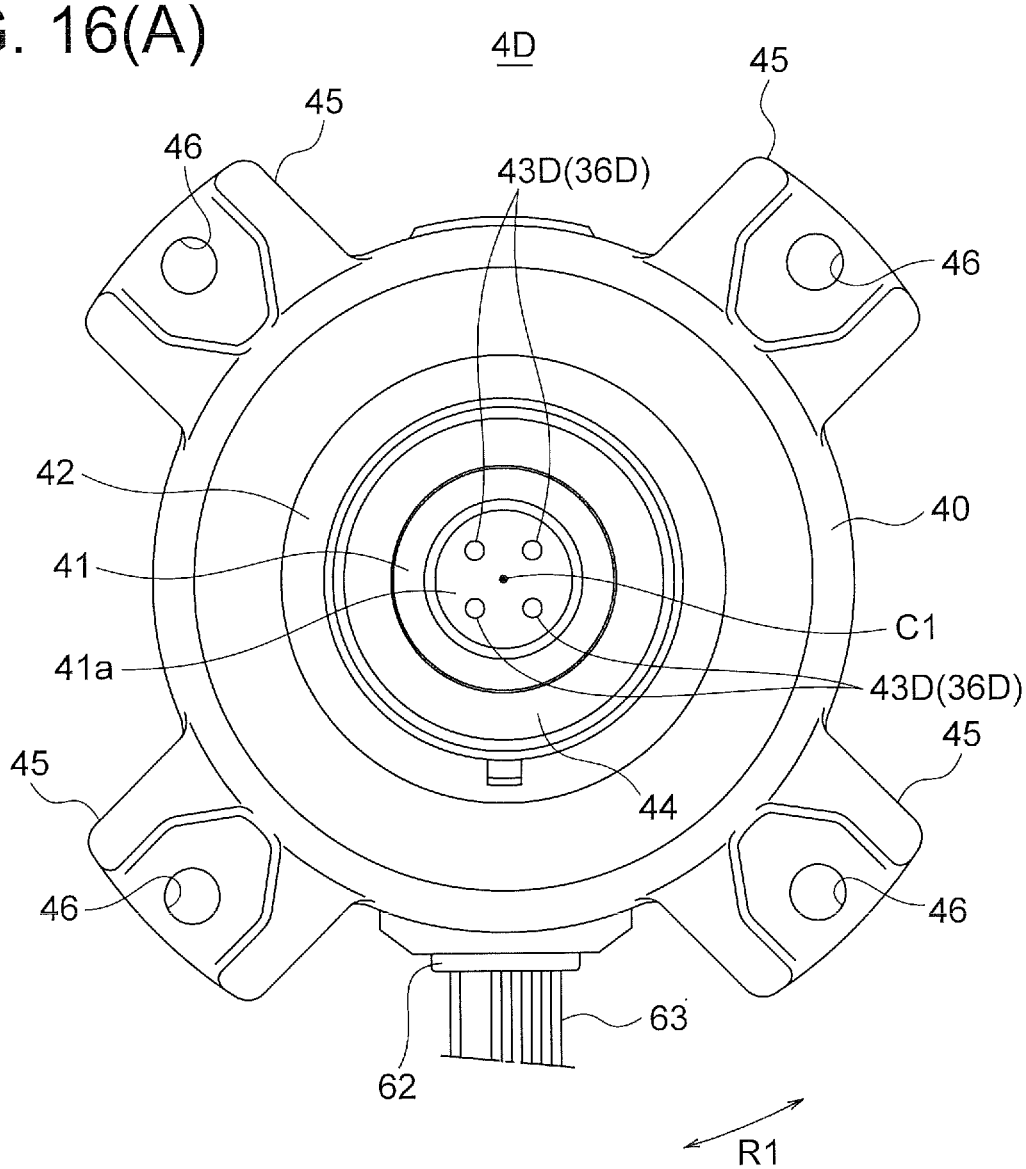
FIG. 16(A) is a diagram of a mold stator of a fourth embodiment as viewed from an opening side.

Next, a fourth embodiment will be described. FIG. 16(A) is a diagram of a mold stator 4D of the fourth embodiment as viewed from the opening 42 side. The mold stator 4D of the fourth embodiment differs from the mold stator 4 of the first embodiment in the numbers of second concave portions 36D of the heat dissipation member 3 and through holes 43D of the bearing holding portion 41.

In the first embodiment described above, the heat dissipation member 3 has the single second concave portion 36. In contrast, in the fourth embodiment, the heat dissipation member 3 has a plurality of second concave portions 36D. The number of second concave portions 36D is four in this example, but only needs to be two or more.

The number of through holes 43D of the bearing holding portion 41 is the same as that of the second concave portions 36D. Each through hole 43D is famed in a position that overlaps the corresponding second concave portion 36D in the axial direction. Each of the second concave portion 36D and the through hole 43D has a circular cross-section in this example, but may have a polygonal cross-section as described in the third embodiment.

Figure 16B:
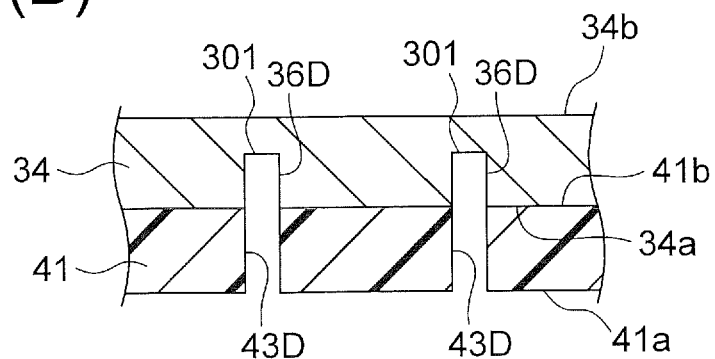
FIG. 16(B) is an enlarged diagram illustrating a part of the mold stator.

FIG. 16(B) is an enlarged sectional view illustrating the second concave portions 36D of the heat dissipation member 3 and the through holes 43D of the bearing holding portion 41. Each second concave portion 36D of the heat dissipation member 3 extends from the first surface 34a toward the second surface 34b of the protruding shape portion 34 and has the bottom portion 301. Each through hole 43D of the bearing holding portion 41 extends from the first surface 41a to reach the second surface 41b.

The second concave portion 36D has a cross-sectional area which is constant in the axial direction in this example, but the second concave portion 36D may be inclined so that its cross-sectional area decreases as the distance from the rotor housing portion 44 in the axial direction increases as described in the second embodiment. The second concave portion 36D may have a point-like bottom portion such as that illustrated in FIG. 14.

Similarly, the through hole 43D has a cross-sectional area which is constant in the axial direction in this example, but the through hole 43D may be inclined so that its cross-sectional area decreases as the distance from the rotor housing portion 44 in the axial direction increases as described in the second embodiment.

Figure 17:
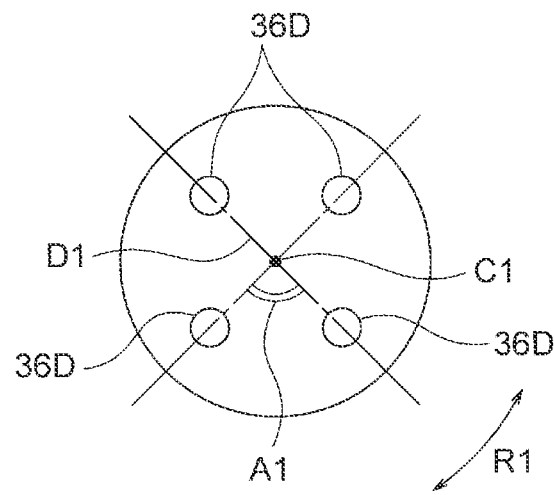
FIG. 17 is a diagram illustrating the arrangement of second concave portions in the fourth embodiment.

FIG. 17 is a diagram illustrating the arrangement of four second concave portions 36D. The four second concave portions 36D are arranged at equal distances from the axis C1 in the radial direction and at equal intervals in the circumferential direction about the axis C1, in this example at intervals of 90 degrees. The arrangement of the through holes 43D is similar to that of the second concave portions 36D.

In the fourth embodiment, the positioning pins 208 (FIG. 8) of the mold 200 are provided corresponding to two or more of the second concave portions 36D of the heat dissipation member 3. Since the second concave portions 36D of the heat dissipation member 3 are arranged at equal distances from the axis C1 and at equal intervals in the circumferential direction, the positioning pins 208 can be brought into engagement with the second concave portions 36D even when the position of the heat dissipation member 3 in the circumferential direction is changed in a plurality of ways.

Figure 18:
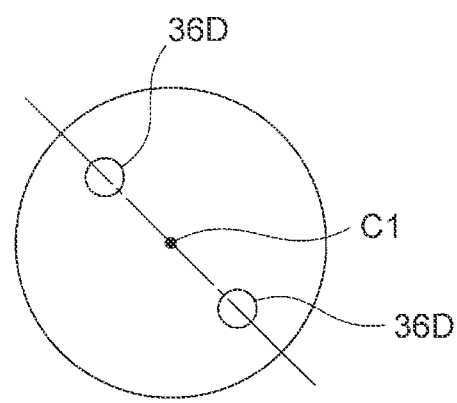
FIG. 18 is a diagram illustrating another example of the arrangement of the second concave portions in the fourth embodiment.

FIG. 18 is a diagram illustrating the arrangement of the second concave portions 36D when the number of second concave portions 36D is two. The two second concave portions 36D are arranged at equal distances from the axis C1 in the radial direction and at equal intervals in the circumferential direction about the axis C1, in this example at intervals of 180 degrees. The arrangement of the through holes 43D is similar to that of the second concave portions 36D.

The motor of the fourth embodiment is configured in a similar manner to the motor 1 of the first embodiment except for the above-described points.

As described above, in the fourth embodiment, the heat dissipation member 3 has a plurality of second concave portions 36D, and thus the rotation of the heat dissipation member 3 within the mold 200 can be prevented by bringing the positioning pins 208 of the mold 200 into engagement with the second concave portions 36D.

In particular, since the second concave portions 36D of the heat dissipation member 3 are formed at equal distances from the axis C1 and at equal intervals in the circumferential direction, the positioning pins 208 can be brought into engagement with the second concave portions 36D even when the position of the heat dissipation member 3 in the circumferential direction is changed in a plurality of ways. Furthermore, a weight balance of the motor 1 can be improved.

Fifth Embodiment

Figure 19:
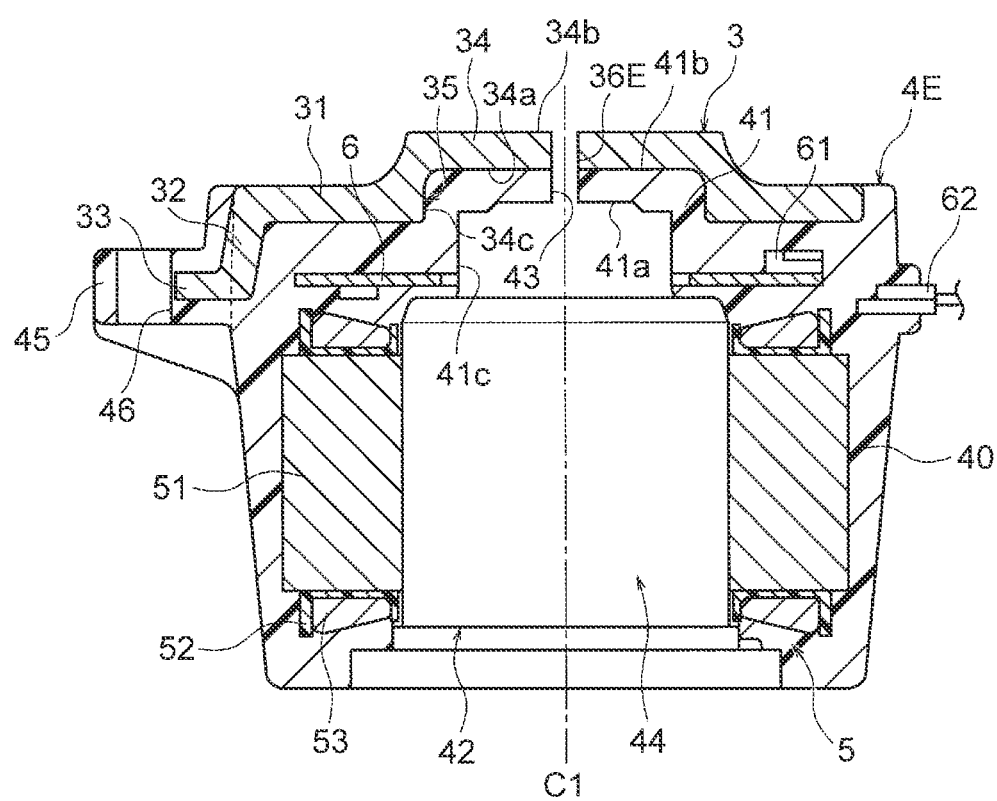
FIG. 19 is a sectional view illustrating a mold stator of a fifth embodiment.

Next, a fifth embodiment will be described. FIG. 19 is a sectional view illustrating a mold stator 4E of the fifth embodiment. The mold stator 4E of the fifth embodiment differs from the mold stator 4 of the first embodiment in the shape of a second concave portion 36E of the heat dissipation member 3.

The second concave portion 36E of the first embodiment described above extends from the first surface 34a toward the second surface 34b of the protruding shape portion 34, but does not reach the second surface 34b. In contrast, the second concave portion 36E of the fifth embodiment extends from the first surface 34a of the protruding shape portion 34 to reach the second surface 34b.

Figure 20:
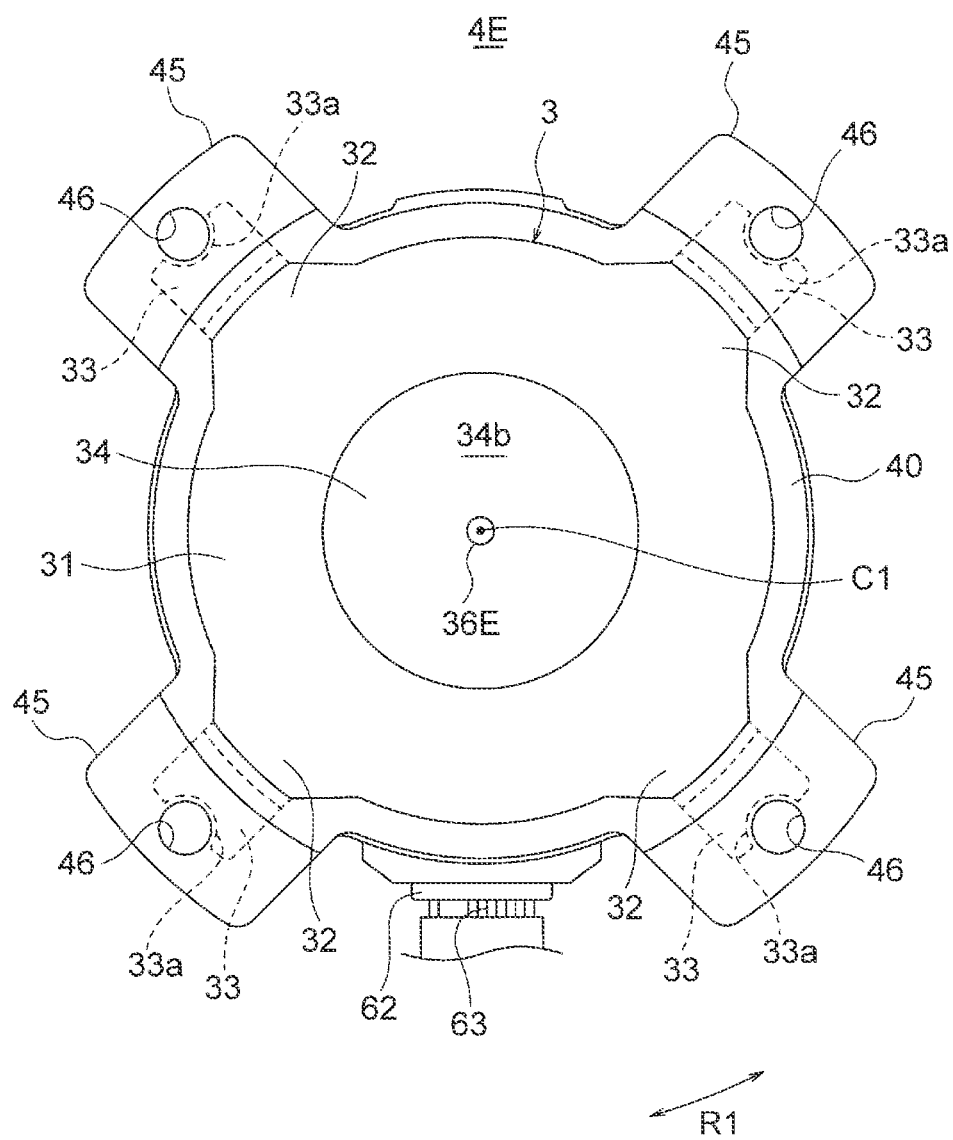
FIG. 20 is a diagram illustrating the mold stator of the fifth embodiment as viewed from a heat dissipation member side.

FIG. 20 is a diagram of the mold stator 4E as viewed from the heat dissipation member 3 side. Since the second concave portion 36E reaches the second surface 34b of the protruding shape portion 34, the second concave portion 36E appears at the second surface 34b of the protruding shape portion 34 when the mold stator 4E is viewed from the heat dissipation member 3 side.

The second concave portion 36E has a circular cross-section in this example, and a cross-sectional shape of the second concave portion 36E is constant in the axial direction. However, the second concave portion 36E may be inclined as described in the second embodiment, or may have a polygonal cross-section as described in the third embodiment. A plurality of second concave portions 36E may be provided as described in the fourth embodiment.

The motor of the fifth embodiment is configured in a similar manner to the motor 1 of the first embodiment except for the points described above.

In the fifth embodiment, since the second concave portion 36E is formed to reach the second surface 34b of the heat dissipation member 3, the positioning pin 208 can be seen through the second concave portion 36E when the heat dissipation member 3 is set in the mold 200. Thus, the workability can be improved.

Sixth Embodiment

Figure 21:
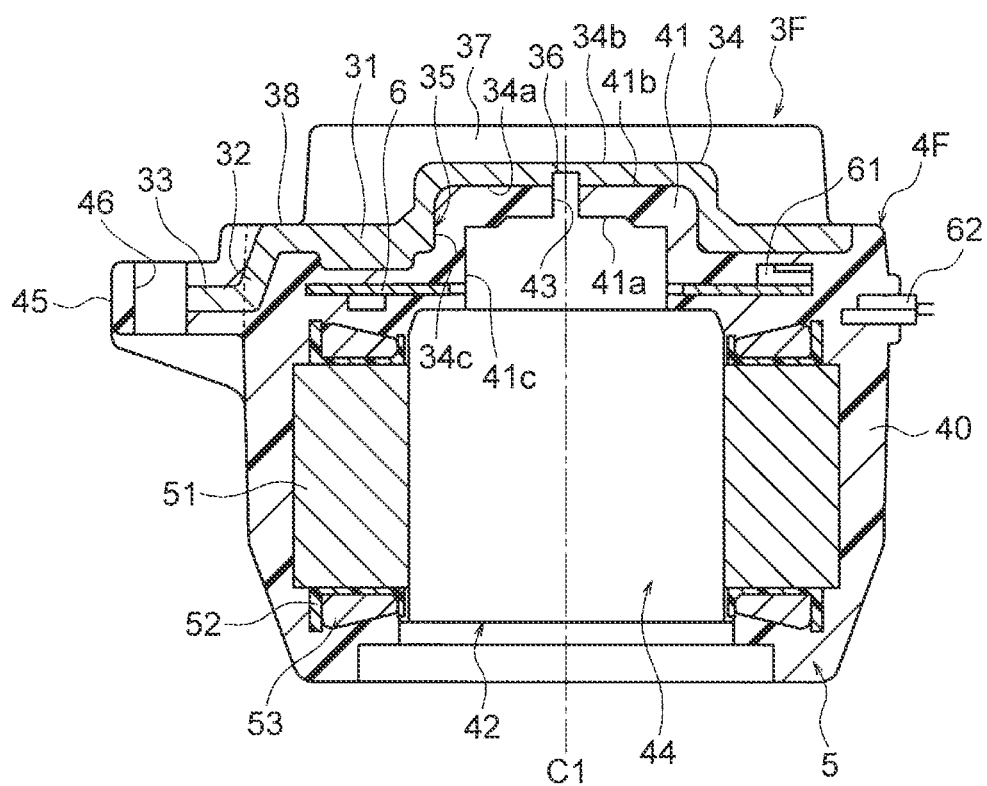
FIG. 21 is a sectional view illustrating a mold stator of a sixth embodiment.

Next, a sixth embodiment will be described. FIG. 21 is a sectional view illustrating a mold stator 4F of the sixth embodiment. The mold stator 4F of the sixth embodiment differs from that of the mold stator 4 of the first embodiment in the shape of a heat dissipation member 3F.

The heat dissipation member 3 of the first embodiment has the plate portion 31 and the leg portions 32. In contrast, the heat dissipation member 3F of the sixth embodiment has fins 37, in addition to the plate portion 31 and the leg portions 32. The fins 37 are famed on the side of the plate portion 31 opposite to the rotor housing portion 44. The fins 37 protrude from the mold resin portion 40 to the outside. The heat dissipation member 3F having such fins 37 is also referred to as a heat sink.

Figure 22A:
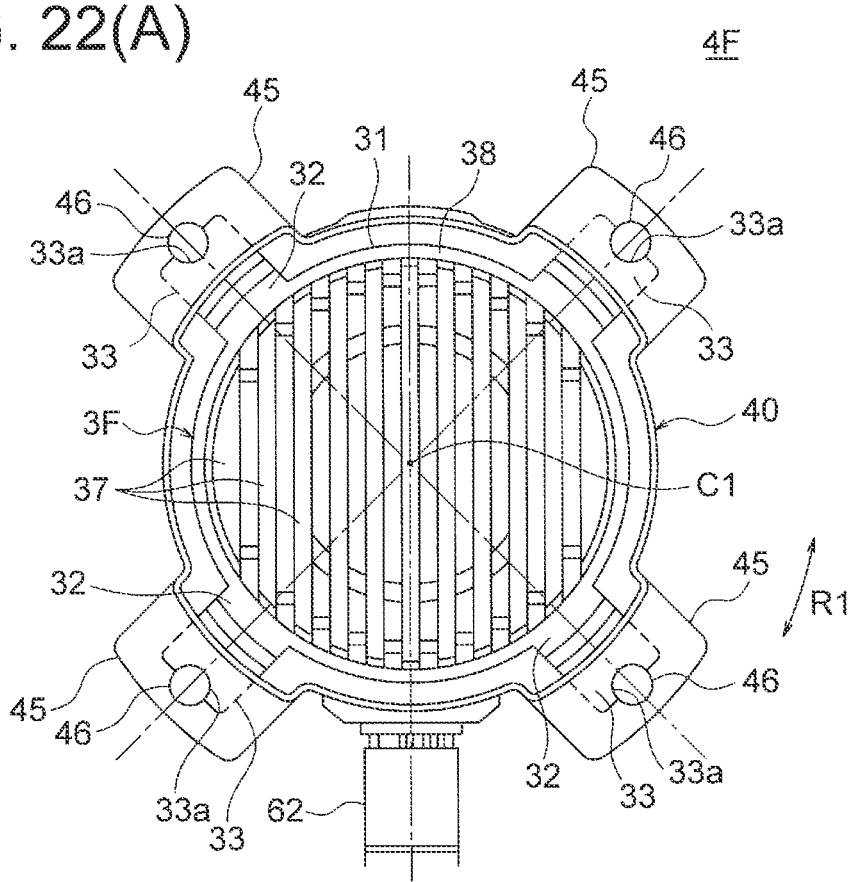
FIGS. 22(A) and 22(B) are respectively a plan view and a side view illustrating the mold stator of the sixth embodiment.
Figure 22B:
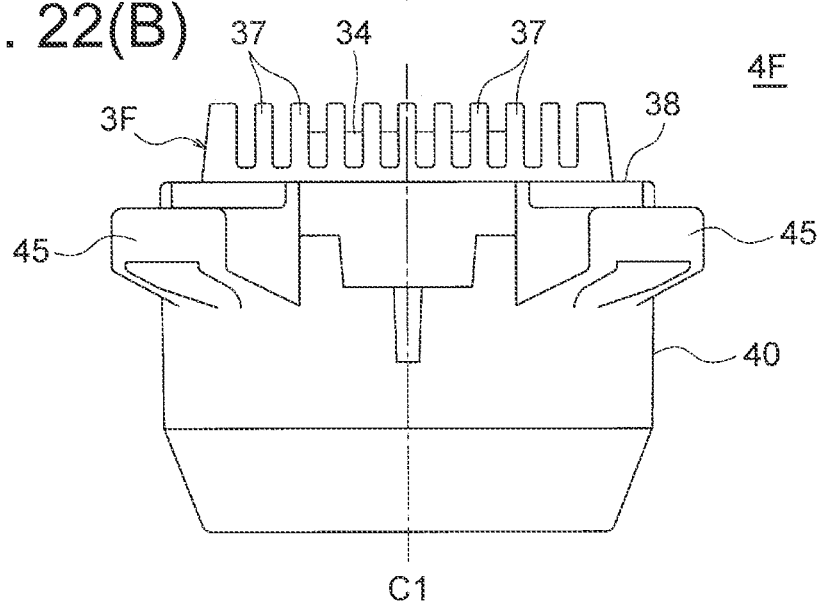

FIG. 22(A) is a diagram of the mold stator 4F as viewed from the heat dissipation member 3F side. FIG. 22(B) is a side view illustrating the mold stator 4F. A plurality of fins 37 are arranged in one direction (in the lateral direction of FIG. 22(A)) in a plane perpendicular to the axial direction. Each fin 37 has an elongated shape in a direction perpendicular to the arrangement direction.

A flange 38 is foiled on the surface of the plate portion 31 of the heat dissipation member 3F so as to surround the fins 37 from an outer side in the radial direction. The flange 38 and the fins 37 are exposed from the mold resin portion 40. The fins 37 and the flange 38 constitute a part of the exposed portion that is exposed from the mold resin portion 40.

The second concave portion 36 and the through hole 43 which are described in the first embodiment are famed in the plate portion 31 of the heat dissipation member 3F and the bearing holding portion 41 of the mold resin portion 40, respectively. Each of the second concave portion 36 and the through hole 43 may have the shape described in the second to fifth embodiments.

The motor of the sixth embodiment is configured in a similar manner to the motor 1 of the first embodiment except for the points described above.

In the sixth embodiment, since the heat dissipation member 3F has the fins 37 and the fins 37 are exposed to the outside from the mold resin portion 40, heat generated by the stator 5 or the like can be dissipated efficiently from the fins 37 to the outside. Thus, the heat dissipation property of the motor 1 can be further improved.

Seventh Embodiment

Figure 23:
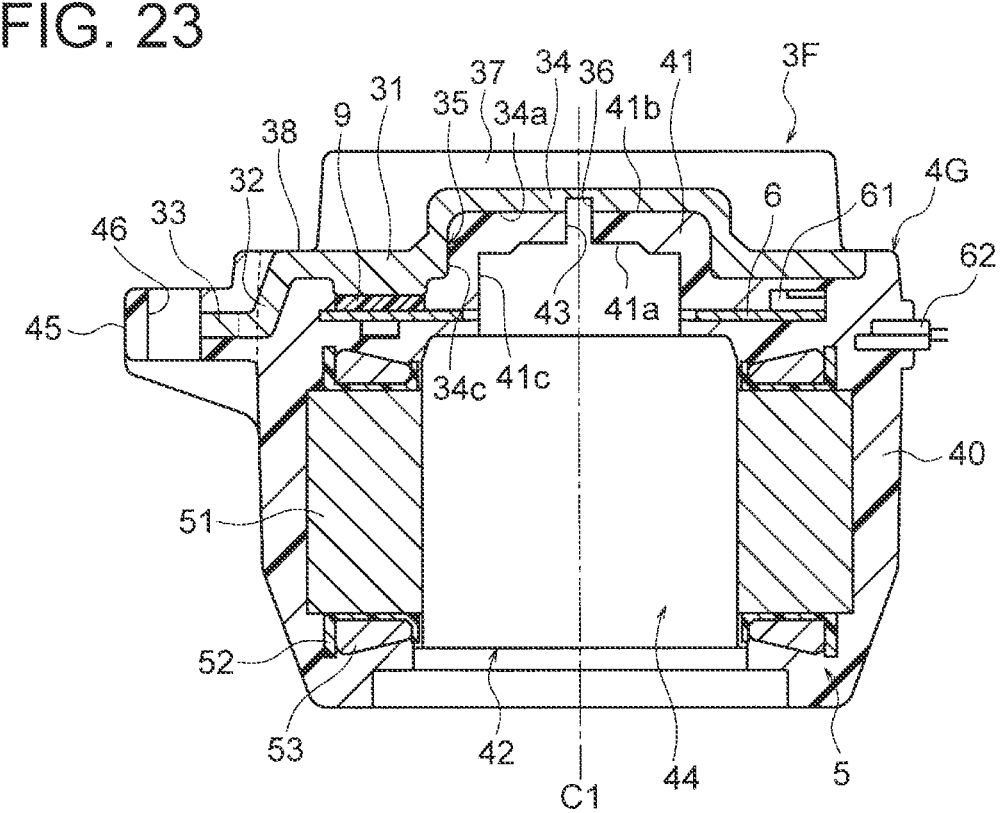
FIG. 23 is a sectional view illustrating a mold stator of a seventh embodiment.

Next, a seventh embodiment will be described. FIG. 23 is a sectional view illustrating a mold stator 4G of the seventh embodiment. In the mold stator 4G of the seventh embodiment, a heat dissipation sheet 9 is disposed between the heat dissipation member 3F and the circuit board 6. The heat dissipation sheet 9 is composed of a resin having a higher thermal conductivity than that of the mold resin portion 40. For example, the heat dissipation sheet 9 is composed of silicone resin.

The heat dissipation sheet 9 in this example is disposed between the plate portion 31 of the heat dissipation member 3F and the circuit board 6. Although not illustrated in FIG. 23, the board holding member 7 (FIG. 5(A)) described in the first embodiment may be disposed between the heat dissipation member 3F and the circuit board 6. Since the board holding member 7 is in the form of the framework including a combination of a plurality of ribs, the heat dissipation sheet 9 can be disposed between the heat dissipation member 3F and the circuit board 6 utilizing spaces between the ribs.

Figure 24:
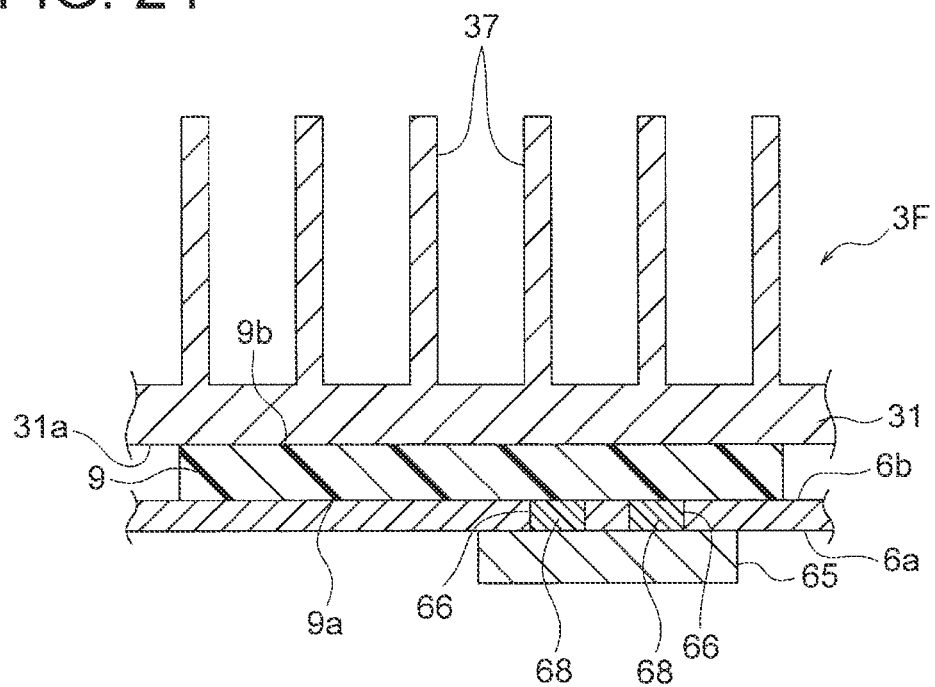
FIG. 24 is an enlarged sectional view illustrating a part of the mold stator of the seventh embodiment.

FIG. 24 is an enlarged sectional view illustrating a part including the heat dissipation member 3F, the heat dissipation sheet 9, and the circuit board 6. The circuit board 6 has a first plate surface 6a on the stator 5 side and a second plate surface 6b opposite to the first plate surface 6a. An element 65 such as the driving circuit 61 is mounted on the first plate surface 6a of the circuit board 6 by soldering.

The heat dissipation sheet 9 has a first sheet surface 9a on the stator 5 side and a second sheet surface 9b opposite to the first sheet surface 9a. The first sheet surface 9a is in contact with the second plate surface 6b of the circuit board 6. The second sheet surface 9b is in contact with the plate portion 31 of the heat dissipation member 3F.

In addition, through holes 66 extending from the first plate surface 6a to reach the second plate surface 6b are famed at positions corresponding to soldering portions of the element 65 on the circuit board 6. A heat conductive member 68 made of copper or the like is disposed in each through hole 66. That is, the heat conductive member 68 is in contact with both the element 65 and the heat dissipation sheet 9.

In the manufacturing process of the motor, the heat dissipation sheet 9 is bonded to the heat dissipation member 3F, and then the heat dissipation member 3F is set in the mold 200 (FIG. 8) together with the stator 5, the circuit board 6, and the board holding member 7. Then, molding is performed. In this way, the motor in which the heat dissipation sheet 9 is disposed between the heat dissipation member 3F and the circuit board 6 can be obtained.

By disposing the heat dissipation sheet 9 between the heat dissipation member 3F and the circuit board 6, heat generated in the circuit board 6 is more likely to be transferred to the heat dissipation member 3F via the heat dissipation sheet 9. Thus, the heat dissipation property can be further improved.

The heat dissipation sheet 9 is desirably sandwiched between the heat dissipation member 3F and the circuit board 6 and compressed to some extent. With this arrangement, during the molding, the resin neither enters between the heat dissipation sheet 9 and the heat dissipation member 3F or between the heat dissipation sheet 9 and the circuit board 6. Thus, high adhesion between the heat dissipation sheet 9 and the heat dissipation member 3F and high adhesion between the heat dissipation sheet 9 and the circuit board 6 can be obtained.

The heat dissipation sheet 9 is not required to have high stickiness because the heat dissipation sheet 9 is molded together with the heat dissipation member 3F and the circuit board 6. Thus, a selection range of material for the heat dissipation sheet 9 can be widened.

Heat generated in the element 65 on the first plate surface 6a of the circuit board 6 is transferred to the heat dissipation sheet 9 through the heat conductive members 68 each of which is in contact with the soldering portion of the element 65 and the heat dissipation sheet 9. Thus, the heat generated in the element 65 can be transferred from the heat dissipation sheet 9 to the heat dissipation member 3F and efficiently dissipated to the outside through the fins 37. Consequently, the heat dissipation property can be improved. Instead of the heat dissipation member 3F, the heat dissipation member 3 of the first to fifth embodiments may be used.

If an element is formed on the second plate surface 6b of the circuit board 6, the surface of the heat dissipation sheet 9 may be uneven since the element on the circuit board 6 is brought into contact with the heat dissipation sheet 9, and thus the adhesion between the heat dissipation sheet 9 and the circuit board 6 may be locally reduced. By forming the element 65 on the first plate surface 6a of the circuit board 6 and connecting the element 65 to the heat dissipation sheet 9 via the heat conductive members 68 as described above, the adhesion between the heat dissipation sheet 9 and the circuit board 6 can be improved, and the heat dissipation property can be improved.

The motor 1 of the seventh embodiment is configured in a similar manner to the motor 1 of the first embodiment except for the above-described points.

As described above, the motor of the seventh embodiment includes the heat dissipation sheet 9 between the heat dissipation member 3F and the circuit board 6 as described above, and thus the heat generated in the circuit board 6 is more likely to be transferred to the heat dissipation member 3F via the heat dissipation sheet 9. Accordingly, the heat dissipation property can be further improved.

The circuit board 6 has the element 65 on the first plate surface 6a, the second plate surface 6b is in contact with the heat dissipation sheet 9, and the element 65 and the heat dissipation sheet 9 are connected via the heat conductive members 68. Thus, the adhesion between the circuit board 6 and the heat dissipation sheet 9 can be improved, and thus heat of the element 65 can be efficiently transferred to the heat dissipation sheet 9.

(Modification of Rotor)

Next, a rotor of a modification of the first to seventh embodiments will be described. FIG. 25 is a sectional view illustrating a rotor 2A of the modification. The rotor 2 (FIG. 2) of each embodiment described above is of the consequent-pole type having the magnet magnetic poles and the virtual magnetic poles. In contrast, the rotor 2A of the modification is a non-consequent-pole type in which all the magnetic poles are composed of magnet magnetic poles.

The rotor 2A has a rotor core 21 having a cylindrical shape about the axis C1. The rotor core 21 is famed of a plurality of electromagnetic steel sheets which are stacked in the axial direction and fixed together by crimping, welding, or bonding. A sheet thickness of each electromagnetic steel sheet is, for example, 0.1 mm to 0.7 mm. The rotor core 21 has a center hole at its center in the radial direction, and the rotation shaft 11 is fixed to the center hole.

In the rotor core 21, a plurality of magnet insertion holes are arranged at equal intervals in the circumferential direction. The shape of each magnet insertion hole 22 is as described in the first embodiment. Flux barriers 27 are formed on both sides of the magnet insertion hole 22 in the circumferential direction. The number of magnet insertion holes 22 is 10 in this example, but is not limited to 10.

The magnet 23 is inserted in each magnet insertion hole 22. The material and shape of the magnet 23 are as described in the first embodiment.

The magnets 23 adjacent to each other in the circumferential direction are disposed so that the opposite magnetic poles face the outer circumference side of the rotor core 21. Thus, all the magnetic poles of the rotor 2A are famed of the magnets 23. In this example, the number of magnetic poles of the rotor 2A is 10.

The non-consequent-pole rotor 2A is less likely to cause vibration and noise as compared to the consequent-pole rotor 2. Even when the non-consequent-pole rotor 2A is used as described in this modification, the effects described in the first to seventh embodiments can be achieved.

(Air Conditioner)

Next, an air conditioner to which the motor of each of the embodiments and modifications described above is applicable will be described. FIG. 26(A) is a diagram illustrating the configuration of an air conditioner 500 to which the motor 1 of the first embodiment is applied. The air conditioner 500 includes an outdoor unit 501, an indoor unit 502, and a refrigerant pipe 503 connecting the units 501 and 502.

The outdoor unit 501 includes an outdoor fan 510 which is, for example, a propeller fan. The indoor unit 502 includes an indoor fan 520 which is, for example, a cross flow fan. The outdoor fan 510 has the impeller 505 and a motor 1A that drives the impeller 505. The indoor fan 520 includes an impeller 521 and a motor 1B that drives the impeller 521. Each of the motors 1A and 1B is constituted by the motor 1 described in the first embodiment. FIG. 26(A) also illustrates a compressor 504 that compresses a refrigerant.

Figure 26B:
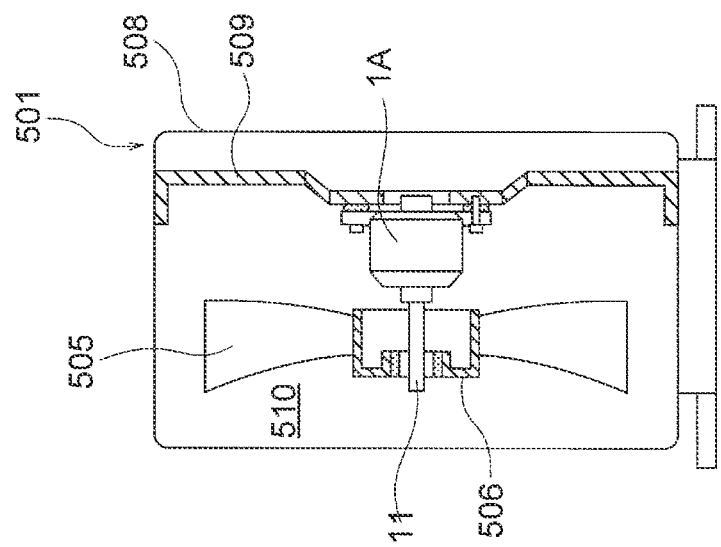
FIG. 26(B) is a sectional view illustrating an outdoor unit.
Figure 26A:
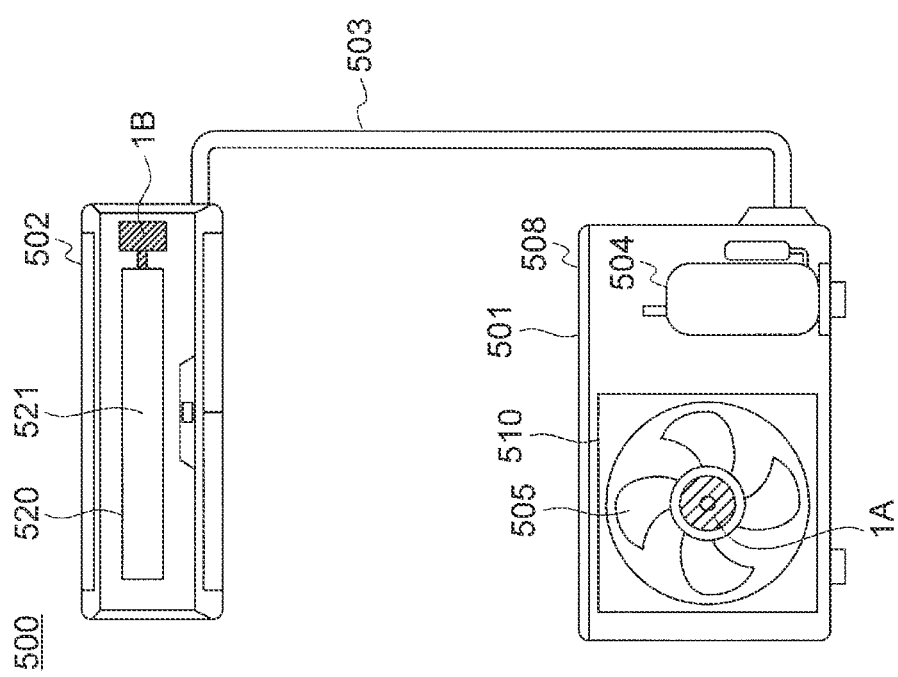
FIG. 26(A) is a diagram illustrating an air conditioner to which the motor of each embodiment is applicable.

FIG. 26(B) is a sectional view of the outdoor unit 501. The motor 1A is supported by a frame 509 disposed in a housing 508 of the outdoor unit 501. The impeller 505 is mounted to the rotation shaft 11 of the motor 1 via a hub 506.

In the outdoor fan 510, the impeller 505 rotates by the rotation of the rotor 2 of the motor 1A to blow air to the outside of a room. During a cooling operation of the air conditioner 500, heat is generated when the refrigerant compressed in the compressor 504 is condensed in a condenser, and the heat is dissipated to the outside of the room by air blown by the outdoor fan 510.

Similarly, in the indoor fan 520 (FIG. 26(A)), the impeller 521 rotates by the rotation of the rotor 2 of the motor 1B to blow air to the inside of the room. During the cooling operation of the air conditioner 500, the refrigerant removes heat from air when the refrigerant evaporates in an evaporator, and the air is blown into the room by the indoor fan 520 blowing air.

The motor 1 of the first embodiment described above has high heat dissipation property and is low in cost. Thus, the reliability of the air conditioner 500 can be improved and the manufacturing cost can be reduced by constituting each of the motors 1A and 1B using the motor 1 of the first embodiment.

Alternatively, the motor of any one of the second to seventh embodiments may be used as the motor 1A, the motor 1B or both. Although the motor 1 is used for both the motor 1A of the outdoor fan 510 and the motor 1B of the indoor fan 520 in this example, it is sufficient that the motor 1 is used as the drive source of at least one of these motors 1A and 1B.

The motor 1 described in each embodiment can be mounted on any electric apparatuses other than the fan of the air conditioner.

Although the desirable embodiments of the present invention have been specifically described above, the present invention is not limited to the above-described embodiments, and various modifications or changes can be made to those embodiments without departing from the scope of the present invention.

What is claimed is:

1. A motor comprising:
   a rotor having a rotation shaft and a bearing mounted to the rotation shaft;
   a stator surrounding the rotor;
   a heat dissipation member provided on one side of the rotor in an axial direction of the rotation shaft; and
   a resin portion having a bearing holding portion that holds the bearing, the resin portion covering the stator and at least a part of the heat dissipation member,
   wherein the heat dissipation member has:
   a first concave portion surrounding the bearing holding portion from an outer side in a radial direction about the rotation shaft; and
   a second concave portion formed on an inner side of the first concave portion in the radial direction.

2. The motor according to claim 1, wherein the bearing holding portion has a through hole in a position that overlaps the second concave portion in the axial direction.

3. The motor according to claim 1, wherein the second concave portion is disposed on an extension line of a center axis of the rotation shaft.

4. The motor according to claim 1, wherein an inner circumferential surface of the second concave portion is inclined with respect to the axial direction.

5. The motor according to claim 1, wherein an inner diameter D1 at an end of the second concave portion on a side closer to the rotor is larger than an inner diameter D2 at an end of the second concave portion on a side farther from the rotor.

6. The motor according to claim 1, wherein the second concave portion has a circular cross-section.

7. The motor according to claim 1, wherein the second concave portion has a polygonal cross-section.

8. The motor according to claim 1, wherein said second concave portion is one of a plurality of second concave portions.

9. The motor according to claim 8, wherein the plurality of second concave portions are formed at equal distances from the rotation shaft and at equal intervals in a circumferential direction about the rotation shaft.

10. The motor according to claim 1, wherein the heat dissipation member has a first surface facing the rotor and a second surface opposite to the first surface, and wherein the second concave portion extends from the first surface to the second surface of the heat dissipation member.

11. The motor according to claim 1, wherein the heat dissipation member has an embedded portion covered with the resin portion and an exposed portion exposed from the resin portion.

12. The motor according to claim 11, wherein the exposed portion of the heat dissipation member has a fin.

13. The motor according to claim 1, further comprising a circuit board between the stator and the heat dissipation member.

14. The motor according to claim 13, wherein a heat dissipation sheet is provided between the heat dissipation member and the circuit board.

15. The motor according to claim 14, wherein the heat dissipation sheet is covered with the resin portion.

16. The motor according to claim 14, wherein the circuit board has an element on a first plate surface facing the stator and is in contact with the heat dissipation sheet at a second plate surface opposite to the first plate surface, and
wherein the circuit board has a heat conductive member extending from the first plate surface to the second plate surface of the circuit board, the heat conductive member being in contact with the element and the heat dissipation sheet.

17. The motor according to claim 1, wherein the rotor has a rotor core and a permanent magnet mounted to the rotor core, and
wherein the permanent magnet constitutes a magnet magnetic pole, and a part of the rotor core constitutes a virtual magnetic pole.

18. A fan comprising:
the motor according to claim 1; and
an impeller driven to rotate by the motor.

19. An air conditioner comprising:
an outdoor unit; and
an indoor unit connected to the outdoor unit via a refrigerant pipe,
wherein at least one of the outdoor unit and the indoor unit has the fan according to claim 18.

20. A manufacturing method of the motor, the method comprising the steps of:
assembling a stator;
integrally molding the stator and a heat dissipation member with a resin to form a resin portion using a mold having a center core corresponding to a rotor, the resin portion covering the stator and at least a part of the heat dissipation member; and
inserting a rotor having a rotation shaft and a bearing mounted to the rotation shaft into an inside of the stator,
wherein the resin portion comprises a bearing holding portion that holds the bearing,
wherein the heat dissipation member has a first concave portion surrounding the bearing holding portion from an outer side in a radial direction about the rotation shaft, and a second concave portion formed on an inner side of the first concave portion in the radial direction, and
wherein in the step of integrally molding the stator and the heat dissipation member with the resin using the mold, a positioning member provided in the mold is brought into engagement with the second concave portion.

* * * * *